United States Patent [19]
Ohishi et al.

[11] Patent Number: 5,375,575
[45] Date of Patent: Dec. 27, 1994

[54] FUEL-INJECTION DEVICE

[75] Inventors: Takashi Ohishi; Mitsuhiro Fujita; Satoshi Yajima; Masahiko Shinagawa, all of Higashimatsuyama, Japan

[73] Assignee: Zexel Corporation, Tokyo, Japan

[21] Appl. No.: 36,863

[22] Filed: Mar. 25, 1993

[30] Foreign Application Priority Data

| Mar. 26, 1992 | [JP] | Japan | 4-100686 |
| Mar. 26, 1992 | [JP] | Japan | 4-100687 |
| Mar. 26, 1992 | [JP] | Japan | 4-100688 |
| Mar. 26, 1992 | [JP] | Japan | 4-100689 |

[51] Int. Cl.$^5$ ............... F02D 41/14; F02D 41/40
[52] U.S. Cl. ............... 123/446; 123/506; 123/502
[58] Field of Search ........... 123/446, 502, 506, 458, 123/494, 490

[56] References Cited

U.S. PATENT DOCUMENTS

| 4,395,905 | 8/1983 | Fujimori et al. | 123/479 |
| 4,479,475 | 10/1984 | Babitzka | 123/458 |
| 4,503,825 | 3/1985 | Schneider | 123/458 |
| 4,535,743 | 8/1985 | Igashira et al. | 123/472 |
| 4,603,669 | 8/1986 | Takemoto et al. | 123/357 |
| 4,721,086 | 1/1988 | Scarnera et al. | 123/490 |
| 4,766,864 | 8/1988 | Ban et al. | 123/506 |
| 4,788,960 | 12/1988 | Oshizawa | 123/506 |
| 4,870,939 | 10/1989 | Ishikawa et al. | 123/506 |
| 4,884,549 | 12/1989 | Kelly | 123/506 |
| 4,974,564 | 12/1990 | Laufer | 123/506 |
| 5,048,488 | 9/1991 | Bronkal | 123/467 |
| 5,076,241 | 12/1991 | Takahashi et al. | 123/458 |
| 5,193,507 | 3/1993 | Rossignol | 123/446 |
| 5,197,439 | 3/1993 | Gronenberg et al. | 123/506 |
| 5,277,163 | 1/1994 | Ohishi | 123/458 |

FOREIGN PATENT DOCUMENTS

| 60-147550 | 8/1985 | Japan . |
| 61-212635 | 9/1986 | Japan . |
| 61-268844 | 11/1986 | Japan . |
| 63-21346 | 1/1988 | Japan . |
| 2176028A | 5/1986 | United Kingdom . |
| WO89/11034 | 11/1989 | WIPO . |

*Primary Examiner*—Willis R. Wolfe
*Assistant Examiner*—Thomas N. Moulis
*Attorney, Agent, or Firm*—Wenderoth, Lind & Ponack

[57] ABSTRACT

A fuel-injection device includes a solenoid valve which adjusts a fuel-injection level of a fuel-injection pump by adjusting its throttling for the fuel-injection passage to supply the fuel to a compressor. A driving pulse to drive the solenoid valve is formed taking various factors into consideration. For example, the driving pulse is composed of a segment having a large duty ratio and a segment having a small duty ratio in order to secure a responsiveness of the solenoid valve. The driving pulse is formed on the basis of a change in electrical voltage to drive the solenoid valve, varying levels of voltage drop in a wiring harness installed for every cylinder, and of varying levels of responsiveness unique with fuel-injection pumps.

27 Claims, 24 Drawing Sheets

FUEL-INJECTION DEVICE

FIELD OF THE INVENTION

The present invention pertains to a fuel-injection device, wherein the injection level of fuel to be supplied to the combustion engine is adjusted by an opening/closing control of the solenoid valve installed at some point along the fuel supplying passage leading to the compressor of the fuel-injection pump.

RELATED ART

Among this type of fuel-injection devices, for example, one of the well-known ones is introduced in Japanese Kokai Patent Publication 63-21346. In this device, since the injection level is determined by the time period that a valve is actually closed (actual closed valve of time period), the time point when the valve of a solenoid valve seats on the seat is detected, and the actual closed valve time period after the valve's seating is counted.

Therefore, on this fuel-injection device, a closed-valve detection unit that detects the time point when the solenoid valve closes in response to the inputting of a driving pulse, and this actual valve's closing detection unit has a voltage-detecting circuit to obtain voltage signals corresponding to the waveform of the flowing current, in response to the driving pulse, in the solenoid valve's excited coil, and a differentiating circuit to differentiate the output voltage from the voltage-detecting circuit.

In the aforementioned reference, however, there are following problems.

(1) In the aforementioned reference, if the voltage (for inputting the pulse) is raised to minimize a response delay in the solenoid valve's seating, as shown by the solid line (X) in FIG. 29, the time period required for the solenoid valve to be seated is Shortened, as shown by $t_7-t_8$ and the solid line (Z) in FIG. 29, but the change in the current value does not clearly indicate the change that occurs when the valve is seated, as shown by the solid line (Y) in FIG. 29, and the responsiveness is poor.

On the other hand, if the voltage for inputting the pulse is lowered to make it easier to detect the time point when the solenoid valve is Seated., as shown by the dotted line (X) in FIG. 29, the change in the current flow at the time of valve's seating becomes more visible, as shown by the dotted line (Y) in FIG. 29, and is therefore, easier to detect, but the time period until the valve is seated becomes longer as shown by $t_7-t_9$, which shows poor responsiveness.

(2) In the aforementioned reference, if the electrical source voltage (battery voltage) becomes lower than a rated voltage level, it takes longer for the solenoid valve to be seated, which delays the start of injection, and since a broader driving pulse width is required to maintain a specific injection level, the responsiveness for fuel-injection becomes poor.

(3) The length of wire (wire harness) connecting the driving circuit to output the driving pulse and the solenoid valve varies for every cylinder in engine layout, and the difference in levels of resistance can be too large to be negligible in some cases.

Thereby, the driving voltage for driving pulse input to every solenoid valve is reduced corresponding to the voltage drop in the wire harness, so the time delay in a valve's closing varies depending on every solenoid valve, and according to this time delay in the valve's closing, a preflow level in every solenoid valve varies, which causes varying levels of injection pressure and of injection amount of the injection pump.

(4) Because the characteristics of every solenoid are different according to every solenoid, and because there are changes in the driving voltage levels, there are differences in the time periods for the valves to be seated. In this case, for example, if driving pulse $V_d$ is input to in the solenoid valve, the time delay in the valve's closing for one valve (a first solenoid valve) is $T_{v1}$, as shown in FIG. 30, whereas, in some cases, for another solenoid valve (a second solenoid valve), the time delay in the valve's the closing is $T_{v2}$ which is greater than the aforementioned $T_{v1}$.

In the case of the first solenoid valve, since the time delay in the valve's closing is as small as $T_{v1}$, the driving pulse width that is obtained by adding this to output time $T_{fq}$ computed from the desired injection level is $T_{d1}$, as shown in FIG. 30 (a). This driving pulse makes the driving current like the one shown in FIG. 30 (b), and the solenoid valve's motion like the one shown in FIG. 30 (c). Then the preflow $Q_{p1}$ will be like the one shown by the diagonal line in FIG. 30 (c).

On the other hand, in the case of the second solenoid valve, since the time delay in the valve's closing $T_{v2}$ is greater than that in the case of the first solenoid valve, the driving pulse width is as long as $T_{d2}$, as shown in FIG. 30 (d), and the preflow $Q_{p2}$ is greater than the aforementioned preflow $Q_{p1}$, as shown by the diagonal line in FIG. 30 (f). FIG. 30 (e) is a time chart for the driving current in the case when the driving pulse shown in FIG. 30 (d) is charged.

As mentioned above, if the length of time delays in valve's closings vary according to every solenoid valve, the preflow and the driving pulse width will resultantly vary even if the output lengths of time are the same; therefore, there is a problem that the injection pressures and injection amounts vary according to every fuel-injection pump.

SUMMARY OF THE INVENTION

The first objective of the present invention is to offer a fuel-injection device which can easily detect the valve's seating time while securing the solenoid valve's responsiveness.

The second objective of the present invention is to offer a fuel-injection device which can secure the solenoid valve's responsiveness by correcting the driving pulse according to a change in the supplied voltage.

The third objective of the present invention is to offer a fuel-injection device which can correct the driving pulses input to every solenoid valve according to a voltage drop in the wire harness leading to every solenoid.

The fourth objective of the present invention is to offer a fuel-injection device which can make the solenoid valve's responsiveness uniform .by correcting differences in the time delays in the valve closings that occur according to every solenoid.

To implement the first objective, a fuel-injection device of the present invention has a fuel-injection pump, and a solenoid valve installed between the high-pressure side and the low-pressure side that lead to the compressor, so as to adjust the communication conditions between the high-pressure chamber and the low-pressure chamber, and said fuel-injection pump's injection level of fuel to be supplied to the combustion engine is adjusted by opening/closing said solenoid valve. In addition, this fuel-injection device comprises: a desired injection level computation means to compute the output time based on the engine throttle position and the engine rotational speed; a driving pulse forming means to form a driving pulse composed of the driving pulse having a large duty ratio in the forced time period and of the driving pulse having a small duty ratio in the limited time period, within the solenoid valve's driving time period determined by the time delay in the solenoid valve's closing and by the output time of the desired injection level; a solenoid valve driving means to drive the solenoid valve by the driving pulse formed by this driving pulse forming means; a current waveform detecting means to detect the current waveform supplied to the solenoid by this solenoid valve driving means; a seating detection means to detect the time point of the solenoid valve's seating from this current waveform.

Accordingly, the driving pulse is composed of the driving pulse with a large duty ratio in the forced time period, and of the driving pulse with a small duty ratio in the limited time period, and the solenoid valve is driven by this driving pulse; therefore, the solenoid valve's responsiveness is improved by the forced time period of large duty ratio, and, simultaneously the seating time point in the current waveform detected by the current waveform detecting means can be made to be more visible by the limited time period of small duty ratio. The detection of the seating, thus, can be done easily with the seating detection means, and the aforementioned first objective can be implemented.

To implement the second objective, a fuel-injection device of the present invention has a fuel-injection pump, and a solenoid valve installed between the high-pressure side and the low-pressure side, that lead to the compressor of the fuel-injection device, so as to adjust the communication conditions between the high-pressure chamber and the low-pressure chamber, and said fuel-injection pump's injection level of the fuel to be supplied to the combustion engine is adjusted by opening/closing the said solenoid valves. And, this fuel-injection device comprises: a desired injection level computation means to compute the output time based on the engine throttle position and the engine rotational speed; a driving pulse forming means to form a driving pulse composed of the driving pulse having a large duty ratio in the forced time period, and of the driving pulse having a small duty ratio in the limited time period, within the solenoid valve's driving time length determined by the time delay in solenoid valve's closing and by the output time of the desired injection level; a solenoid valve driving means to drive the solenoid valve by the driving pulse formed by this driving pulse forming means; a current waveform detecting means to detect the current waveform supplied to the solenoid by this solenoid valve driving means; a seating detection means to detect the time point of the solenoid's seating from this current waveform; an electrical source voltage detecting means to detect electrical source voltage used for the control of the solenoid valve; a driving pulse correcting means to adjust the forced time period and the duty ratio of the driving pulse of the limited time period; a solenoid valve driving means to drive the solenoid valve by the driving pulse corrected by this drive pulse correcting means.

Accordingly, the driving pulse is composed, by the driving pulse forming means, of the driving pulse having a large duty ratio in the forced time period, and of the driving pulse having a small duty ratio in the limited time period, within the driving time period determined by the time delay in the solenoid valve's closing and by the output time computed by the desired injection level computation means, and based on the voltage value detected by the electrical source voltage detecting means, the forced time period is made longer and the duty ratio of the driving pulse of the forced time period is made larger if the voltage value is lower than the rated voltage value, while the forced time period is made shorter and the duty ratio of the driving pulse is made smaller if the voltage value is higher than the rated voltage value. Thus, by adjusting the forced time period and the duty ratio of the driving pulse of the limited time period, the aforementioned second objective can be implemented.

To implement the third objective, the fuel-injection device of the present invention has a fuel-injection pump assigned for every engine cylinder and a solenoid valve installed between the high-pressure side and the low-pressure side, that lead to the compressor of the fuel-injection pump, so as to adjust the communication conditions between the high-pressure chamber and the low-pressure chamber, and it adjusts the injection level of the fuel to be supplied to the combustion engine from the fuel-injection pump, by opening/closing the solenoid value with the driving pulse determined by the time delay in the solenoid valve's closing, and by the output time of the desired injection level, which is computed from the engine throttle position and the engine rotational speed; it also has the driving pulse correcting means to correct the driving pulse charged in the solenoid valve assigned for each engine cylinder corresponding to the voltage drop that occurs between the solenoid valve and the circuit to drive the solenoid valve.

Accordingly, the driving pulse charged in every solenoid is corrected according to the level of voltage drop in the wire harness connecting the solenoid valve and the driving circuit to drive the solenoid valve; therefore, against this voltage drop, which increases in proportion to the distance from the driving circuit, the driving pulse, which is adjusted to compensate for the drop, is input to every solenoid valve, and the driving current flowing in the solenoid of every solenoid can be uniform, and the third objective, thus, can be implemented.

To implement the fourth objective, a fuel-injection device of the present invention has a fuel-injection pump, and a solenoid valve installed between the high-pressure side and the low-pressure side, that lead to the compressor of the fuel-injection device, so as to adjust the communication conditions between the high-pressure chamber and the low-pressure chamber, and the fuel-injection pump's injection level of the fuel to be supplied to the combustion engine is adjusted by opening/closing the solenoid valves, and this device also has a valve closing-time delay detecting means to detect the time delay in solenoid valve's closing and a driving pulse correcting means to correct the driving pulse, so that the time delay in the valve's closing detected by this valve closing-time delay detecting means will be uniform for every solenoid valve.

Accordingly, the time delay in valve's closing for every solenoid valve assigned for every engine cylinder is detected by the valve closing-time delay detecting means, and in order to make this time delay in valve's closing uniform, the time delay in the valve's closing is made to be smaller by raising the voltage for the driving pulse by a specific value or by making the duty ratio larger when the time delay in the valve's closing is larger than a specific level, while the time delay in the valve's closing is made to be larger by lowering the voltage for the driving pulse by a specific value or by making the duty ratio smaller when the time delay in the valve's closing is smaller than a specific level; therefore, the time delay in the valve's closing becomes uniform for every solenoid valve assigned for every controlled engine cylinder, and the fourth objective is, thus, implemented.

PREFERRED EMBODIMENTS OF THE INVENTION

The following explanation is provided for the preferred embodiments of the present invention with reference to the drawings.

Figure 1:
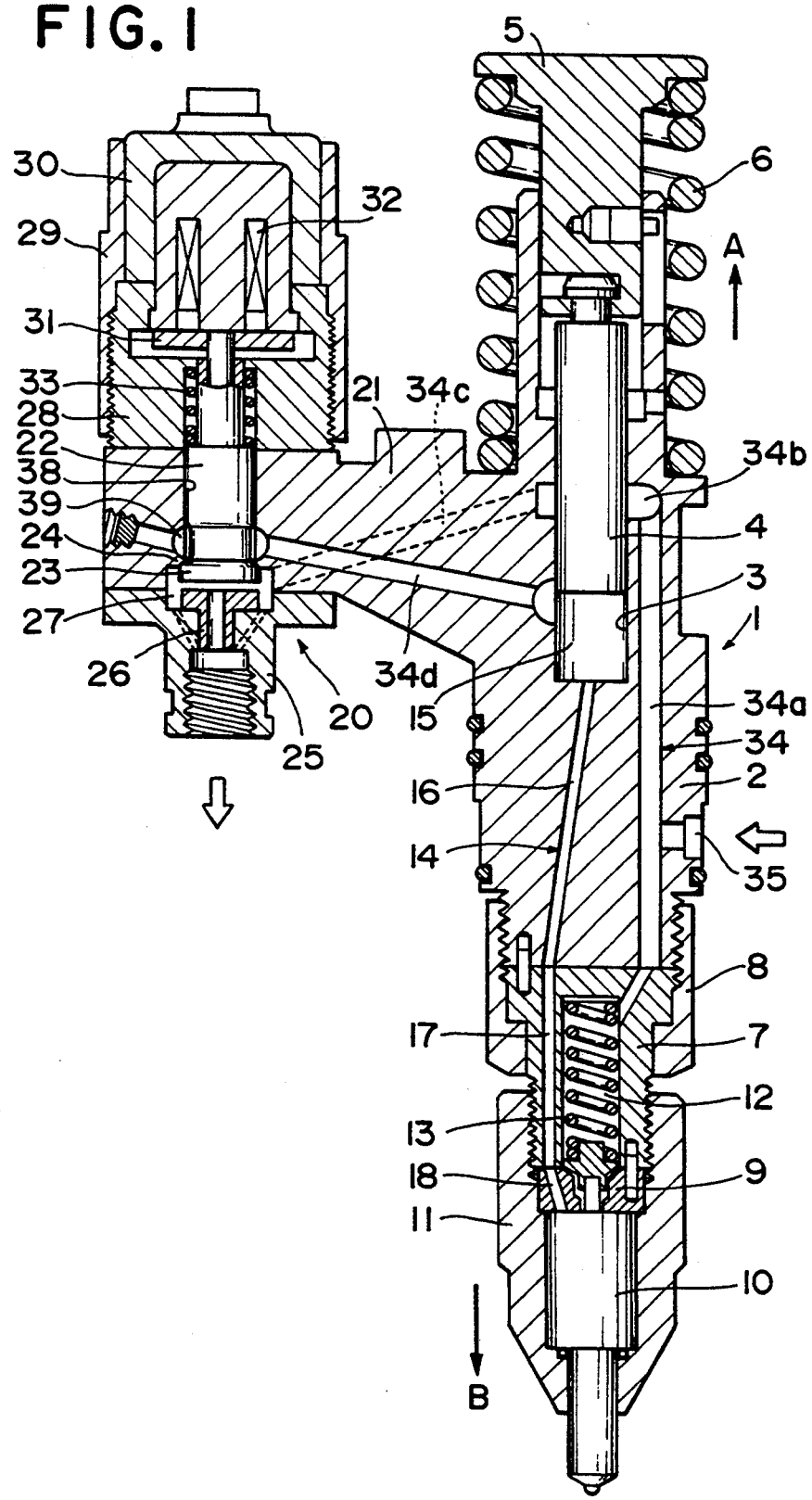
FIG. 1 is a sectional view of the structure of the fuel-injection device in accordance with a preferred embodiment of the present invention.

In FIG. 1, the fuel-injection device has a unit injector type fuel-injection pump 1, for example, a fuel-injection pump that supplies a fuel by injection to each cylinder of diesel engine, and on the base of plunger barrel 2 of this injection pump 1, cylinder 3, in which plunger 4 is slidably inserted, is formed. On plunger barrel 2, a spring receptacle is formed, and between the spring receptacle of plunger barrel 2 and tappet 5 connected with plunger 4, spring 6 is included, by which plunger 4 is constantly pushed away from plunger barrel 2 (direction indicated by an arrow A in the figure). Tappet 5 contacts a cam formed on a driving shaft not shown in the figure, and the driving shaft rotates, while being connected to the engine, and reciprocates plunger 4 in cooperation with the aforementioned spring 6 in cylinder 3. By this reciprocating motion of plunger 4, compressor 15 takes in the fuel and compresses it as well.

On the edge of plunger barrel 2, holder 7 is mounted, with screwing holder nuts 8, to secure holder 7 on the circumference of plunger barrel 2, and on this holder 7, nozzle 10 is mounted via spacer 9; the spacer 9 and nozzle 10 are secured to the end of holder 7 by a retaining nut 11 fastened to their exterior surfaces and screwed to the circumference of the end of holder 7. On holder 7, spring case 12 is formed, and by nozzle spring 13 accommodated in spring case 12, a needle valve of the nozzle, not shown in the figure, is pushed toward the tip of the nozzle (direction shown by the arrow B in the figure). The structure of the nozzle is a well- known one, and its needle valve is opened when a high-pressure fuel is supplied via high-pressure passage 14 mentioned below, so that the fuel is injected from an injection hole in the tip of the nozzle.

High-pressure passage 14 consists of passage 16 formed inside plunger barrel 2, with its one end opened into compressor 15, passage 17 formed in the holder and leading to passage 16, passage 18 formed in the spacer 9 and leading to passage 17, and of a passage (not shown in the figure) formed in the nozzle 10 and leading to passage 18.

On one side of plunger barrel 2, valve housing 21 in which solenoid valve 20, mentioned later, is installed is integrally installed and extended, and on the plunger barrel and on valve housing 21, fuel-supplying passage 34 to supply the fuel to the aforementioned compressor 15 is installed. This fuel-supplying passage 34 consists of: a first fuel-supplying passage 34a, to which the fuel is supplied from fuel-intake 35 formed on the side of plunger barrel 2; a loop-shaped channel 34b connected to this first fuel-supplying passage 34a and formed on one part of cylinder 3 on which plunger 4 is constantly sliding; a second fuel-supplying passage 34c connected to this loop-shaped channel 34b and leading to valve case 27 of solenoid valve 20; a third fuel-supplying passage 34d, one end of which is connected to loop-shaped groove 39 made around rod 22 so as to lead to valve case 27 via the valve, and other end of which is connected to the aforementioned compressor 15.

The supply of the fuel to compressor 15 is adjusted by solenoid valve 20, and rod 22 of this solenoid valve 20 is slidably inserted in sliding hole 38 made in valve housing 21. On valve housing 21, valve seat 24, which is formed on the tip of rod 22 and contacts with poppet valve 23, is mounted, and a header 25 is screwed to valve housing 21 to cover valve 23. On the plane where header 25 and valve housing 21 contact each other, valve case 27 is formed surrounded by header 25 and valve housing 21, and on this valve case 27, stopper 26 of the valve is secured on the side of header 25 so as to face valve 23.

Rod 22 is inserted through holder 28 that is screwed to the opposite side of header 25 of valve housing 21, and is connected to an armature 31 positioned between the holder 28 and solenoid barrel 30 fastened to holder 28 by holder nut 29. This armature 31 is facing a solenoid 32 held a in solenoid barrel 30. In the aforementioned holder 28, a spring 33 constantly pushing the valve 23 away from the valve seat 24 is accommodated; valve 23 normally stays apart from valve seat 24, and the valve 23 is driven to be brought into contact with valve seat 24 when the armature 31 is attracted to the solenoid 32 by a current flow through solenoid 32.

The diameter of rod 22 is slightly smaller in front of valve 23, and loop-shaped groove 39 having a large diameter than that is formed to face the portion of the rod with a smaller diameter in loop-shaped groove 39. To this loop-shaped 39 is connected to the aforementioned fuel-supplying passage 34d. To the aforementioned valve case 27, as mentioned earlier, the second fuel-supplying passage 34c is connected, and the fuel is constantly supplied to fill valve case 27 via fuel-supplying passage 34c. Therefore, when valve 23 is moved away from valve seat 24, and plunger 4 is taking the fuel in, the fuel filled in the valve case 27 reaches loop-shaped groove 39 through the space between rod 22 and sliding hole 38, and is supplied from this loop-shaped groove 39 to compressor 15 via third fuel-supplying passage 34d. The fuel supplying-pressure at this time is approximately 5 kg/cm$^2$.

When the solenoid is operated, in other words, at the time point when valve 23 is seated on valve seat 24, the fuel-supply passage 34 is shut off by solenoid valve 20, and the fuel which has been already supplied to compressor 15 is compressed, by the compressing process of the aforementioned plunger 4, to be supplied to nozzle 10 via high-pressure passage 14. This pressure transport of the fuel is completed when the current flow to solenoid 32 is stopped, a part of the high-pressure fuel on the high-pressure side (high-pressure passage 14, compressor 15, and third fuel-supplying passage 34d) is returned to valve case 27 upon valve 23's moving away from valve seat 24, and the fuel-pressure in the compressor is reduced.

Figure 2:
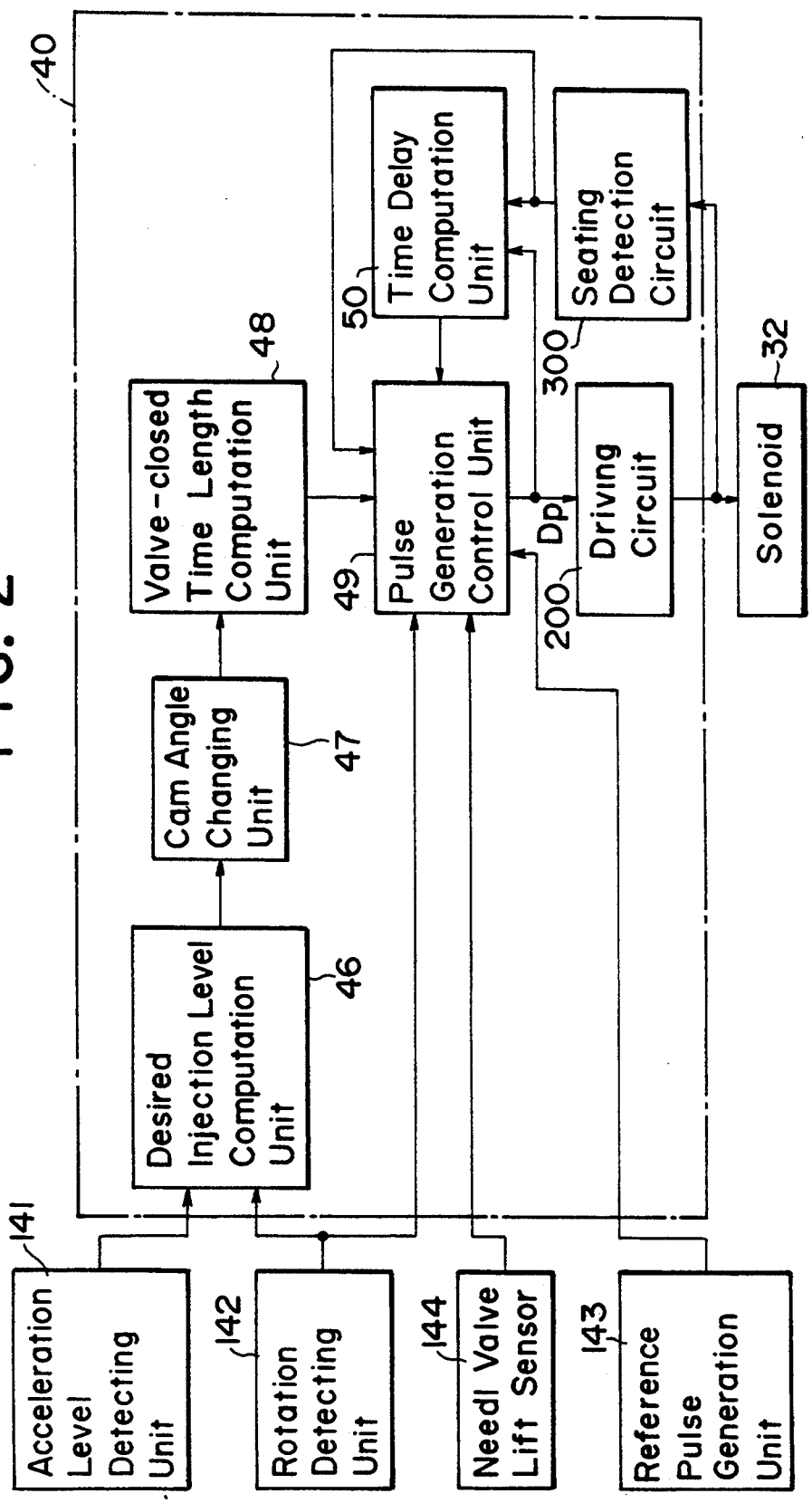
FIG. 2 is a functional diagram illustrating the control mechanism of the fuel-injection device in accordance with a preferred embodiment of the present invention.

The current flow to the aforementioned solenoid 32 is controlled by control unit 40, as shown in FIG. 2. Control unit 40 consists of an A/D converter not shown in the figure, a multiplexer, a microcomputer, a driving circuit 200 mentioned below, and a seating detection circuit 300, and in this control unit 40, signals are input from each of acceleration level detecting unit 141 to detect the level of pushing the acceleration pedal (acceleration level), engine rotation detecting unit 142, reference pulse generating unit 143 which is attached to the driving shaft and generates pulses every time the driving shaft reaches the reference angle position, and from needle valve lift sensor 144 to detect the time point of the needle valve's lifting.

FIG. 2 shows, for convenience, a functional diagram for the processes carried out in the aforementioned control unit 40. The processes carried out in control unit 40 is explained below with reference to this diagram. The output signals from acceleration level detecting unit 141 and engine rotation detecting unit 141 are input to the desired injection level computation unit 46, and based on these input signals, the most desirable injection level suitable for the then driving conditions of the engine is computed from the map data and is output as the desired injection level signal.

A cam angle converter 47 inputs the aforementioned desired injection signal, computes, based on the specific map data, the cam angle necessary to obtain the aforementioned most desirable injection level, according to the engine rotation speed, and outputs the result as a cam angle signal.

A valve-closed time length computation unit 48, receiving the aforementioned cam angle signal, converts the cam angle signal to the time necessary for the cam to rotate by the cam angle computed by cam angle conversion unit 47. In other words, in this unit, the necessary length of time (the closed-valve length of time) $T_q$, from the time point when solenoid valve closes and the injection begins until the time point when the desired injection amount has been injected, is computed.

The length of time $T_q$ computed in this unit does not include the time delay $T_v$ that is the length of time during which valve 23 remaining apart from valve seat 24 begins to move and is completely seated on valve seat 24. Therefore, the driving pulse width $T_d$ which is actually necessary to drive solenoid valve 20 consists of the sum of $T_q$ and $T_v$, that is, ($T_d = T_q + T_v$).

A pulse generation control unit 49 adds the valve-closed time length $T_q$ computed in the aforementioned valve-closed time length computation unit 48 to the time delay $T_v$ computed in the time delay computation unit 50, and determines the time to output a driving pulse $D_p$ having the driving pulse width $T_d$ determined by the sum of $T_q$ and $T_v$, to driving circuit 200; more specifically, it determines the most adequate timing to start the fuel-injection, on the basis of the reference signals generated by the reference pulse generating unit 143, the injection timing signals generated by the needle valve lift sensor 144, and the rotation signals generated by the rotation detecting unit 142.

Figure 3:
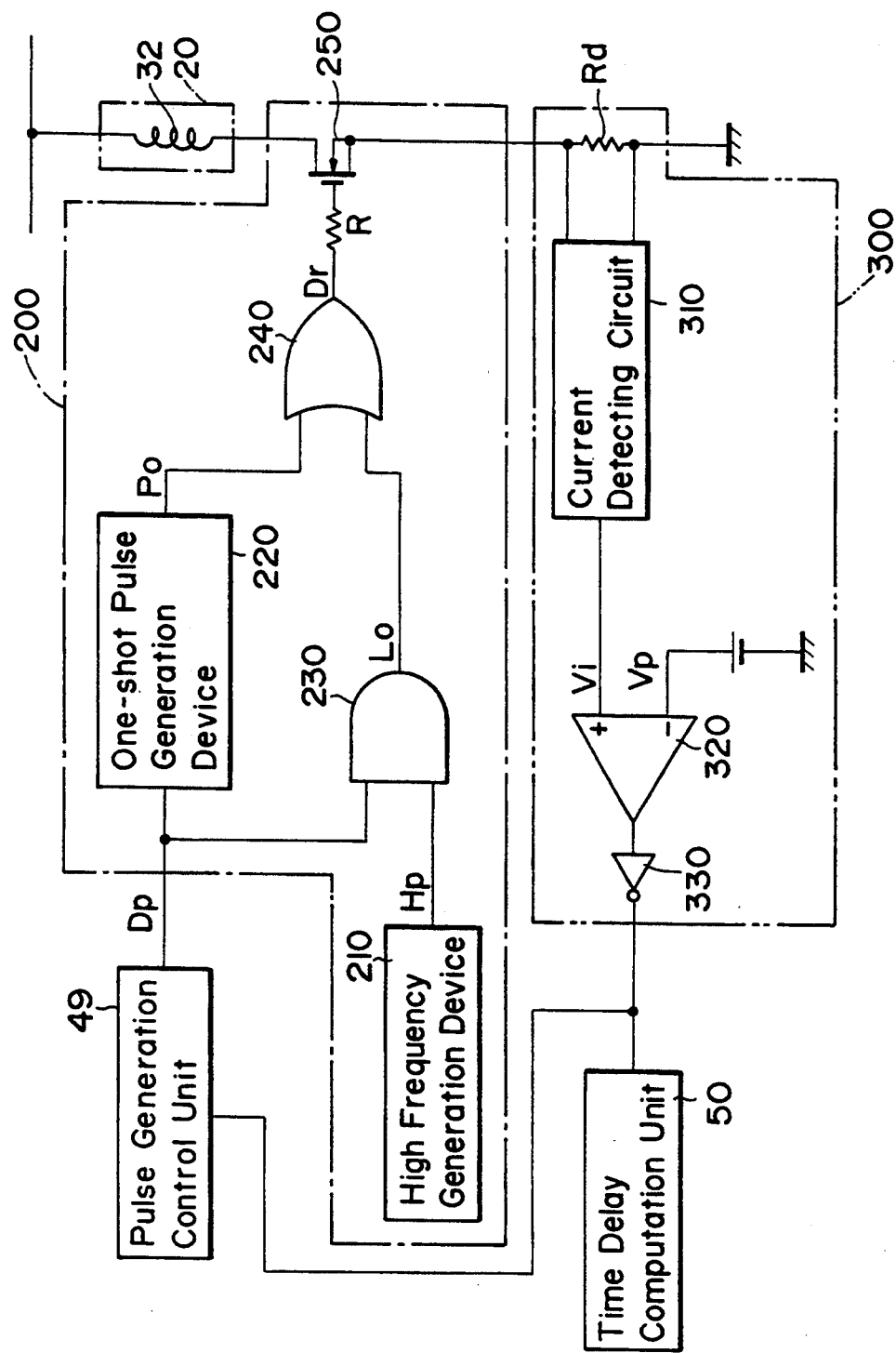
FIG. 3 is a circuit diagram of the driving circuit in accordance with a preferred embodiment of the present invention.
Figure 4:
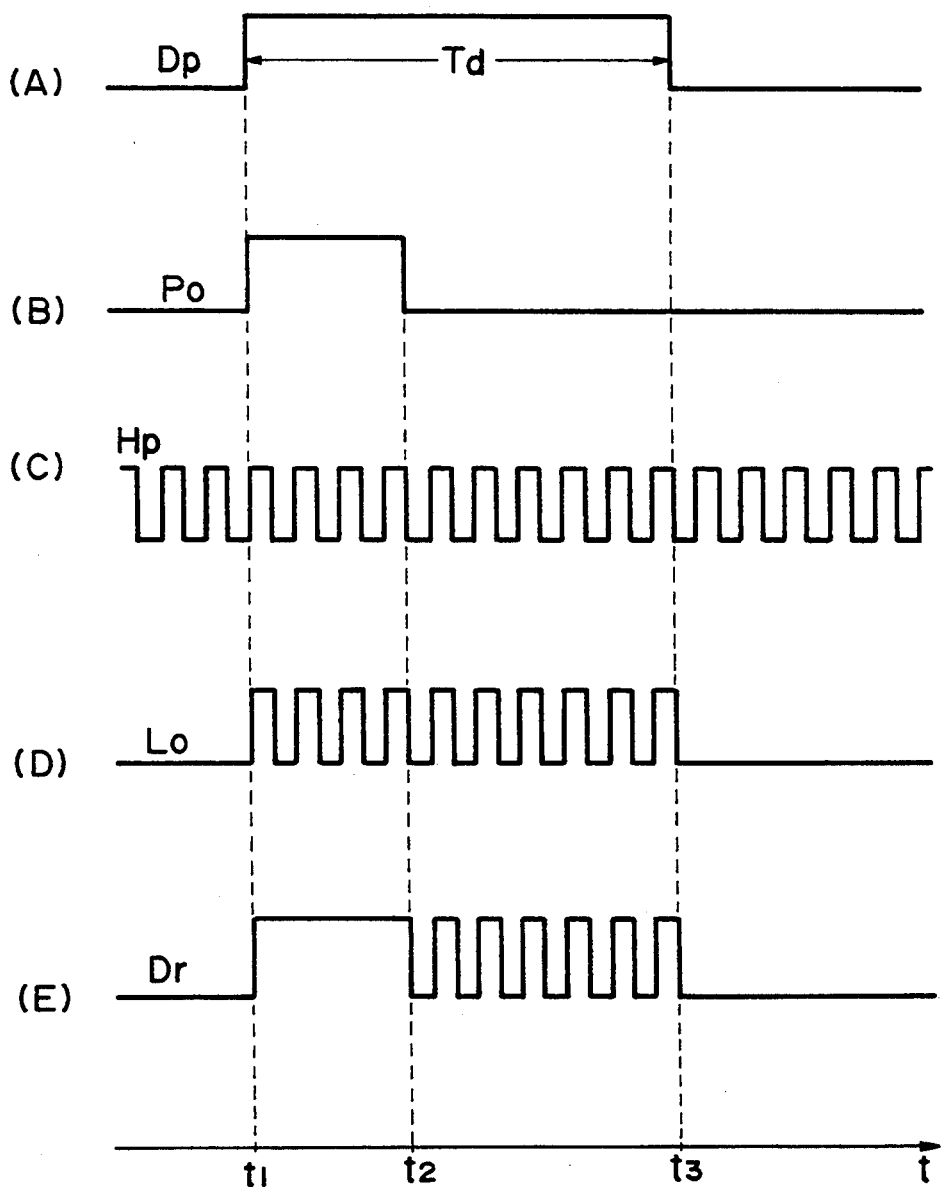
FIGS. 4(A)–(E) are a time chart of the driving circuit.

The driving circuit 200 consists of a high-frequency pulse generation device 210, an one-shot-pulse generation device 220, an AND gate 230, an OR gate 240, and a field effect type transistor (FET) 250, as specifically shown in FIG. 3, and the driving pulse $D_p$ (shown in FIG. 4 (A)) generated by the pulse generation control unit 49 is input to the one-shot-pulse generation device 220, and to one of the input terminals of the AND circuit 230.

The one-shot-pulse generation device 220 generates a pulse $P_o$ having a large duty ratio (100% in this case), shown by the specific time period ($t_1 - t_2$) from the time point when the driving pulse $D_p$ rises, as shown in FIG. 4 (B). This specific time length is preliminarily defined on the basis of experiments. High-frequency square waves $H_p$ are input to AND gate 230 along with the driving pulse $D_p$, as shown in FIG. 4 (C) from high-frequency pulse generation device 210, and AND gate 230 outputs signal pulse $L_o$ which consists of high-frequency square waves only for the time period $t_1 - t_3$, as shown in FIG. 4 (D).

The pulse signal $P_o$ output from the one-shot-pulse signal generation device 220 and the pulse $L_o$ output from AND gate 230 are input to the OR gate 240, and, as shown in FIG. 4 (E), the actual driving pulse signal $D_r$ having a large duty ratio in the time period $t_1 - t_2$ (forced time period) and a small duty ratio in the time period $t_2 - t_3$ (limited time period) is output from OR gate 240.

This actual driving pulse $D_r$ is input to the gate of the FET 250 via resistor R, and by this actual driving pulse signal $D_r$, the FET 250 conducts so as to supply the current to thereby solenoid 32 and to drive valve 23 in the direction of closing.

Accordingly, since the actual driving pulse is composed of a driving pulse having a large duty ratio in the forced time period length and of a driving pulse having a small duty ratio in the limited time period, the motion of valve 23 can be accelerated by a pulse having a large duty ratio in the beginning of solenoid valve 20's driving when a greater driving force is needed, and during the subsequent time period after the beginning of the valve's driving when the valve's closing needs to be detected, the actual voltage can be lowered by a pulse having a small duty ratio so as to make a changing point of the current (an inflection point in the current) more visible at the time of the valve 23's seating.

A seating detection device 300 detects the valve 23's seating by detecting the curving point of the current generated when valve 23 seats in valve seat 24, and it consists of the resistor $R_d$, connected in series to solenoid 32, a current detecting circuit 310 to detect the current by detecting the voltage on across of this resistor, $R_d$, a comparator 320 to compare the voltage $V_i$ corresponding to this detected current with a threshold voltage $V_p$, and an invertor 330.

When the actual driving pulse $D_r$ is charged in this seating detection device 300, the current flowing in solenoid 32 flows through the resistor $R_d$, and is detected by current detecting circuit 310, where the current is converted to the voltage value $V_i$ corresponding to the current value to be input in the noninverting terminal of comparator 320.

Figure 5:
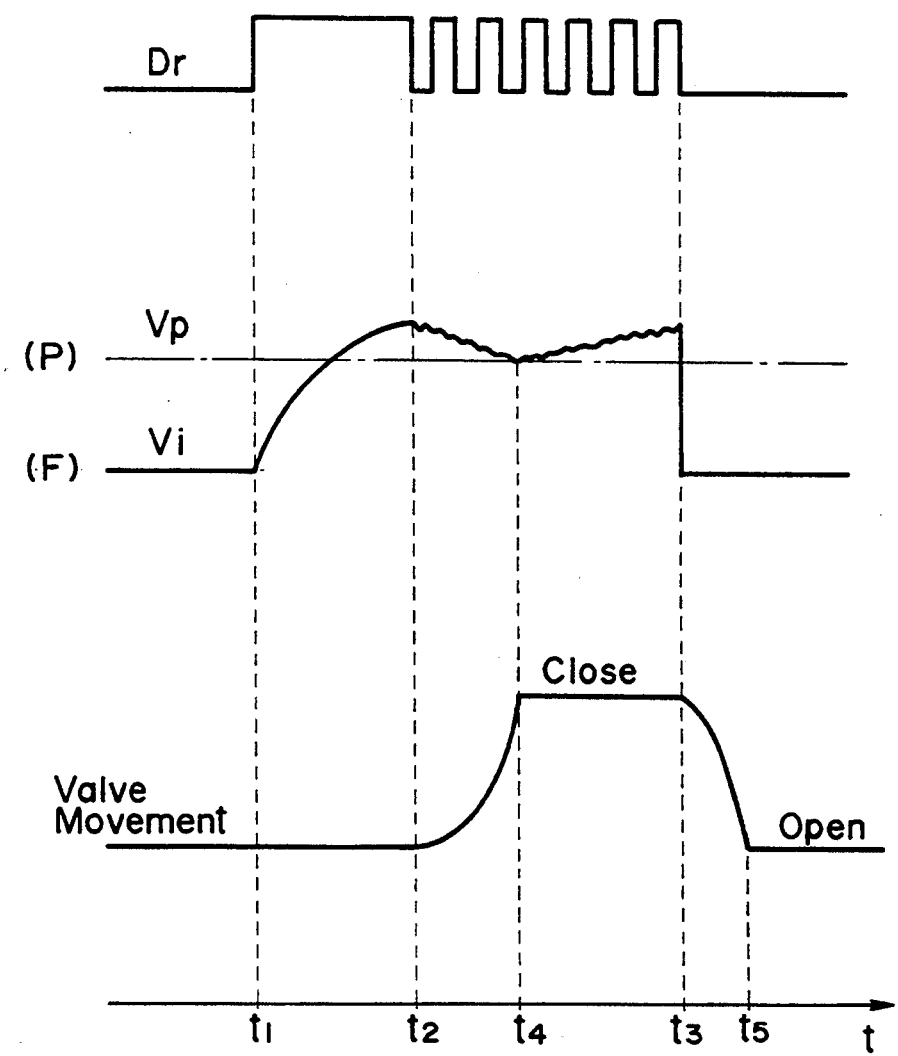
FIG. 5 is a time chart illustrating the actual driving pulse, the voltage equivalent to current, and the motion of the valve.

This voltage value $V_i$ gradually rises during the forced time period ($t_1 - t_2$), and gradually declines during the limited time period ($t_2 - t_3$) until the seating time point ($t_4$), being followed by the gradual increase that continues from the time point at which the seating begins until its completion ($t_3$), as shown in FIG. 5 (F). The solenoid valve's seating time point can be detected from the characteristic that the current inflection point is formed at the time when the solenoid valve 20 is seated.

In other words, the inverting terminal of the comparator 320 receives the threshold voltage $V_p$ having a specific level of voltage, and from this comparator 320, the seating signals are supplied to the time delay computation unit 50 and pulse generation control unit 49, since the output becomes L at the time point ($t_4$) when the voltage value $V_i$ becomes lower than the threshold voltage $V_p$, and the output of the invertor 330 becomes H. In an example of the preferred embodiment of the present invention, the minimal point (inflection point) caused by the valve 23's seating was judged from the voltage, but the current inflection point for the seating may be judged by the differentiated signal by installing a differentiating circuit.

As to the computation of the time delay in the valve's closing $T_v$, derived from the motion of the valve, and computed in the time delay computation unit 50, its timing begins, as soon as the driving pulse is input to the time delay computation unit 50, at the point when the Dp rises, and ends at the point when the seating signal output from seating detection circuit 300 is received.

The time period of valve 23's being pushed away from valve seat 24, that is shown by $t_3 - t_5$ in FIG. 5, is defined by the pushing force of spring 33.

Figure 6:
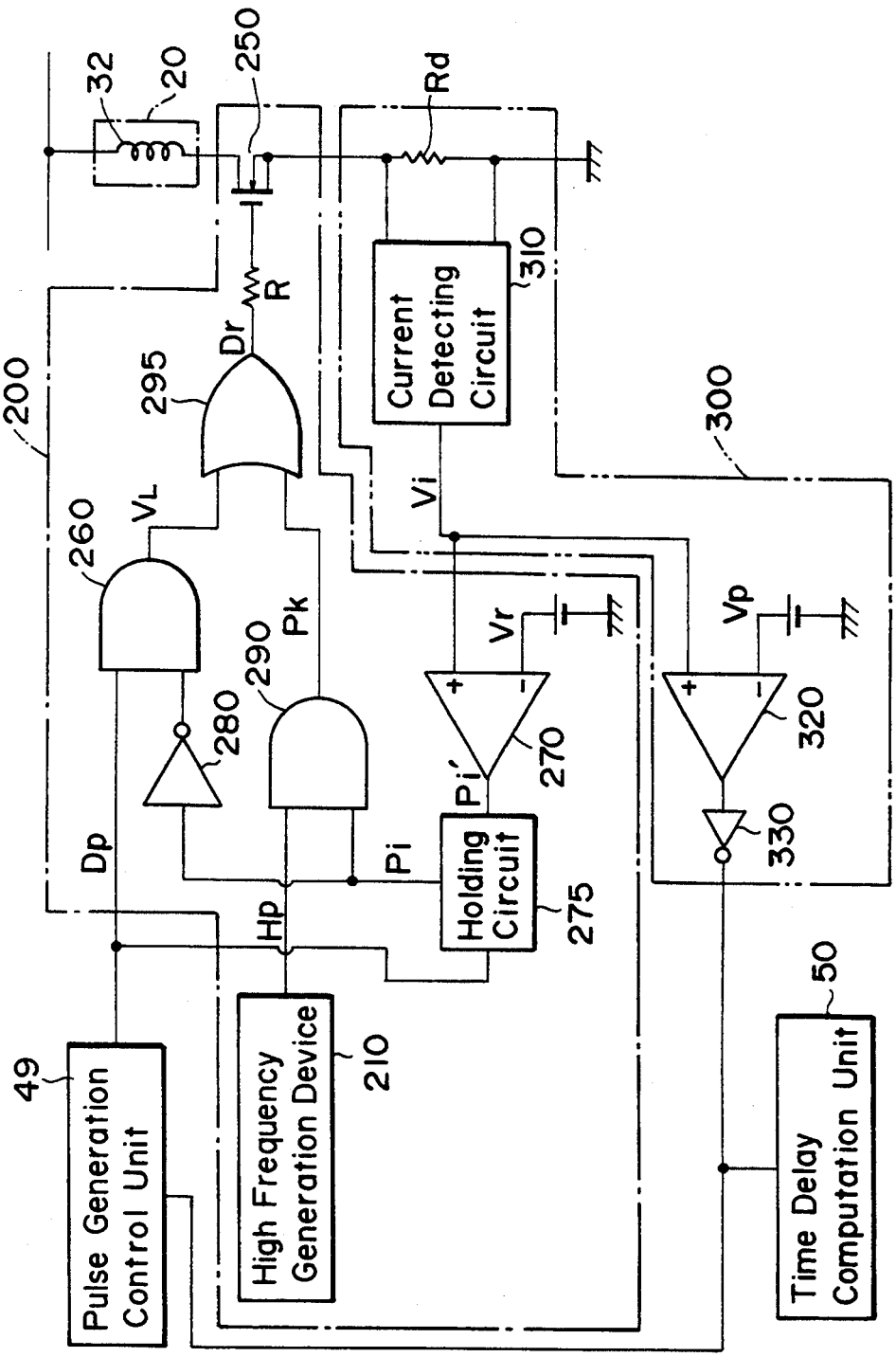
FIG. 6 is a circuit diagram of the driving circuit in accordance with a preferred embodiment of the present invention.

Another example of a preferred embodiment of the present invention is explained below with reference to FIG. 6. The same components as shown in the aforementioned example are identified by the same reference number.

The driving circuit 200 of this example consists of a high-frequency pulse generation device 210, two AND gates 260, and 290, a gate 295, a resistor R, a FET 250, a comparator 270, and of an invertor 280. With this driving circuit 200, the driving pulse $D_p$ (FIG. 7 (G)) output from the pulse generation control unit 49 is input to one input of the AND gate 260. Signal $P_i$ shown in FIG. 7 (I) is input via invertor 280 to another input of AND gate 260. This signal $P_i$ is formed by a holding circuit 275, where driving pulse $D_p$ output from the pulse generation control unit 49 is input, as well as the signal $P_i'$ that is output from comparator 270 when the voltage $V_i$ (FIG. 7 (H)) corresponding to the current flowing in the solenoid 32 put out from current detecting circuit 310 in seating detection circuit 300 becomes higher than the voltage $V_i$. This holding circuit 275, once the signal $P_i'$ is input, defines its output signal, at this point, as $H_i$, and forms the signal $P_i$ by retaining this condition until the completion time of the driving pulse $D_p$.

Figure 7:
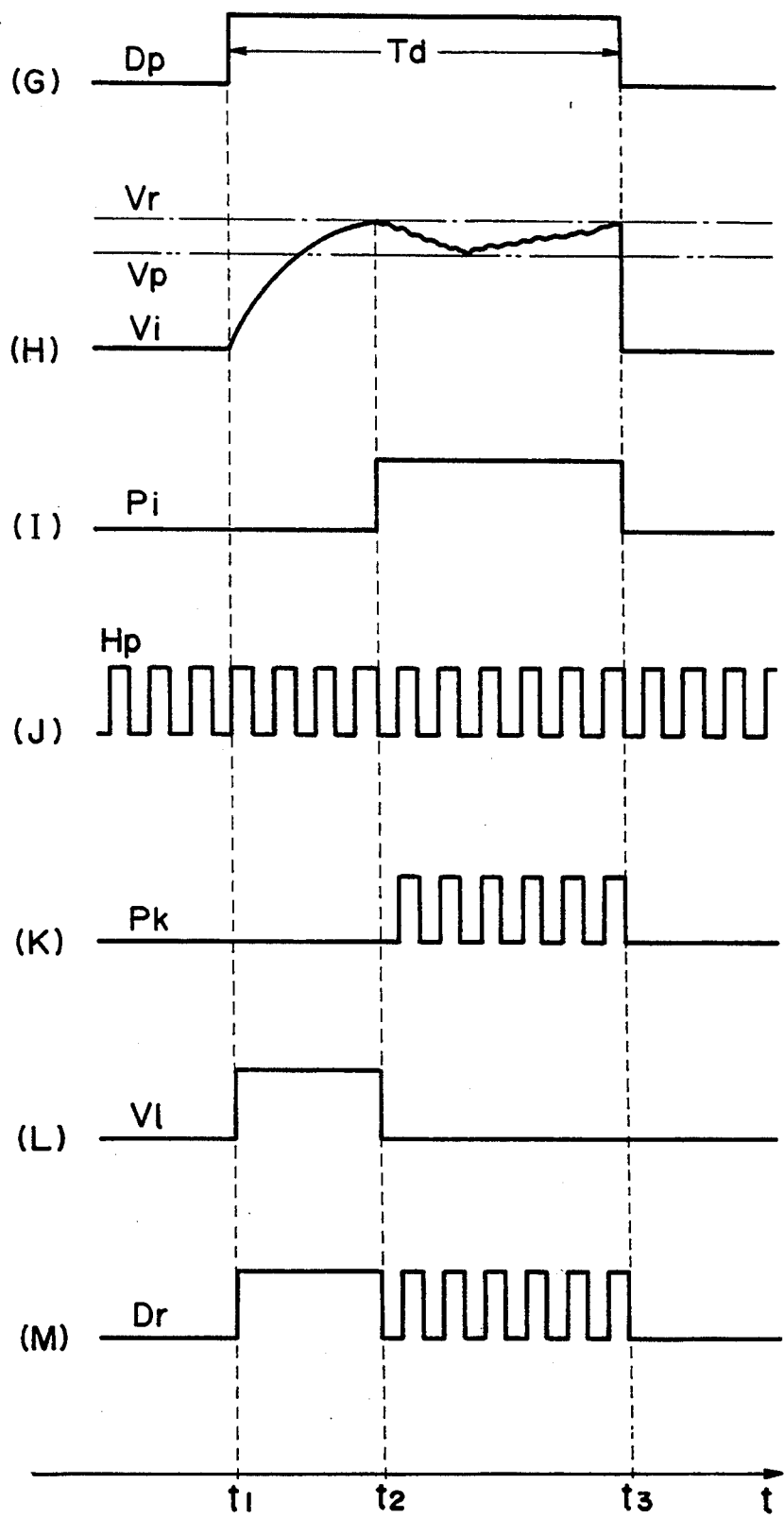
FIGS. 7(G)–(M) are a time chart of the driving circuit.

Thus, the output signal $V_L$ (FIG. 7 (L)) of AND gate 260 has a rectangular waveform having a duty ratio of 100% for the time period $t_1 - t_2$, and is input to the OR gate 295. A high-frequency signal $P_k$ (FIG. 7 (k)) that consists of high-frequency square waves only for the limited time period ($t_2 - t_3$) and formed when high-frequency square waves $H_p$ (FIG. 7 (J)) output from the high-frequency wave generation device and the signal $P_i$ are input to AND gate 290 is input to OR gate 295. Thus, the same actual driving pulse $D_r$ as in the aforementioned example can be obtained from the output of OR gate 295.

In this driving circuit 200, unlike the aforementioned example, wherein the driving circuit's forced time period was defined as a specific time period from the result of experiments, a specific consideration for defining the forced time period is not necessary, since the forced time period ends when the current reaches a specific value or higher.

As explained above, according to the present invention, the forced time period wherein the duty ratio of the driving pulse supplied to the solenoid is large and the limited time period wherein the duty ratio is small are established; therefore, the responsiveness of the solenoid valve can be improved so as to be faster by the driving pulse having the large duty ratio during the forced time period, and the detection of the solenoid valve's seating can be performed definitely by the driving pulse having the small duty ratio during the limited time period.

The following explanation is provided for an example of the control of the solenoid valve to secure the responsiveness of the solenoid valve, by correcting the driving pulse according to the changes in supplied voltage.

Figure 8:
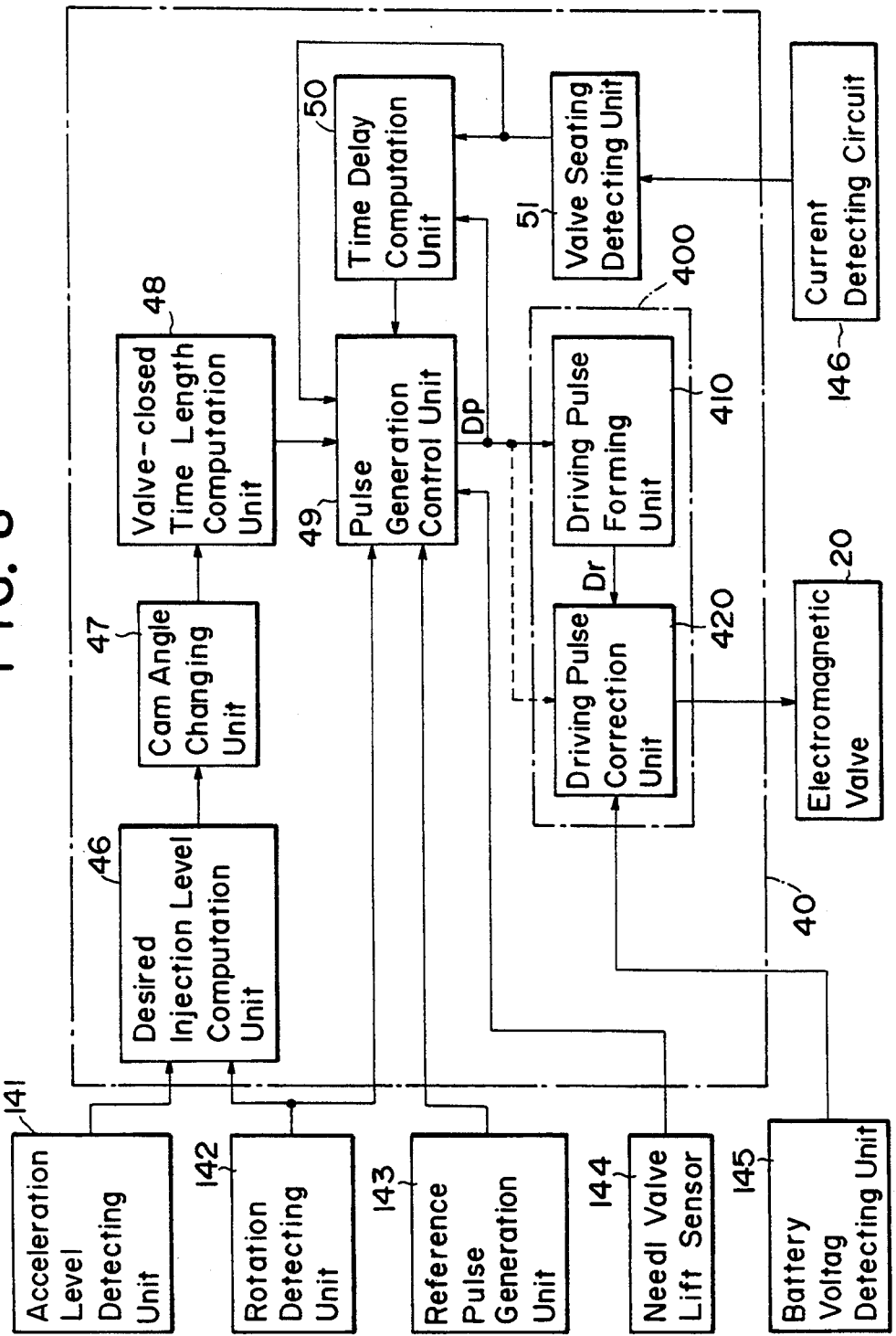
FIG. 8 is a functional diagram illustrating the control mechanism of the fuel-injection device in accordance with a preferred embodiment of the present invention.

Of the hardware structure of FIG. 1 explained above, control unit 40, used to control the solenoid valve 20, is shown in FIG. 8. Control unit 40 consists of an A/D converter, multiplexer, microcomputer, and driving circuit 400, which are not shown in the figure; in the control unit, signals are input from each of an acceleration level detection unit 141 to detect the pushing level of the accelerator (acceleration level), a rotation detecting unit 142 to detect the engine rotation speed, a reference pulse generating unit 143 that is attached to the driving shaft and generates a pulse every time the driving shaft reaches the reference angle position, a needle valve lift sensor 144 to detect the time point of the needle valve's lifting, a current detecting circuit 146 to detect the value of the current flowing in solenoid valve 20 and to output a corresponding signal, and a battery voltage detecting unit 145 to detect an electrical source voltage (battery voltage) supplied to the solenoid valve.

In FIG. 8, the processes carried out in the aforementioned control unit 40 is shown for convenience by a functional diagram. The following explanation is provided for the components which are not shown in the functional diagram in FIG. 2. The desired injection level computation unit 46, cam angle conversion unit 47, valve-closed time length computation unit 48, pulse generation control unit 49, and time delay computation unit 50 have already been shown in FIG. 2, so an explanation thereof has been omitted here.

Figure 9:
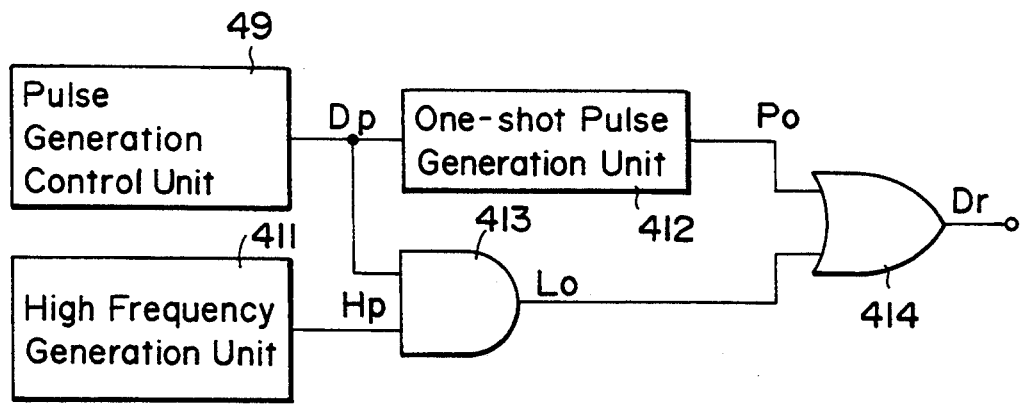
FIG. 9 is a circuit diagram illustrating the driving pulse forming unit in accordance with a preferred embodiment of the present invention.

The driving circuit 400 consists of a driving pulse forming unit 410 and a driving pulse correcting unit 420. The driving pulse forming unit 410 consists of a high-frequency pulse wave generating unit 411, a one-shot-pulse generating unit 412, a AND gate 413, and an OR gate 414, as shown in FIG. 9. The driving pulse $D_p$ (FIG. 5 (b)) generated by the pulse generation control unit 49 is input to the one-shot-pulse generating unit 412 and to one of the input terminals of the AND gate 413.

Figure 10:
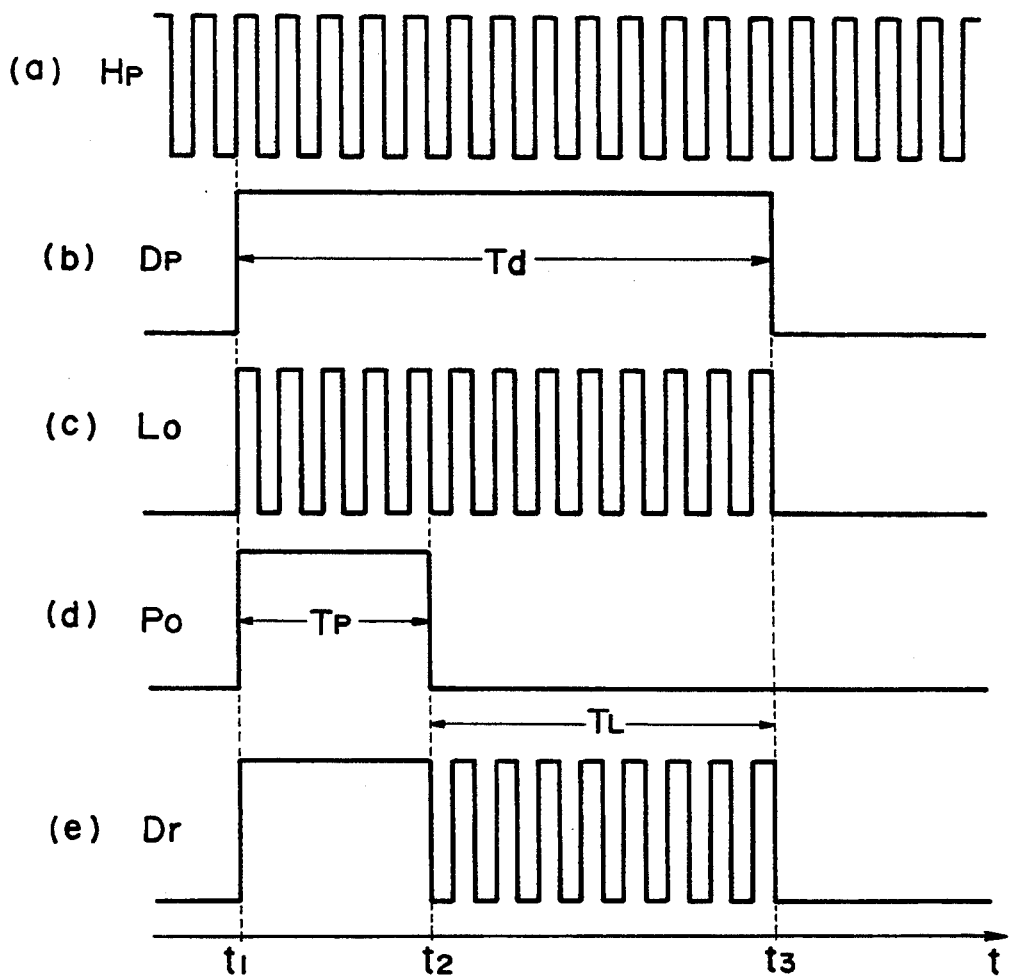
FIGS. 10(a)–(e) are time chart of the driving pulse forming unit.

The one-shot-pulse generating unit 412 generates the pulse Po having a large duty ratio (100% in this case) shown by a specific time period ($t_1 - t_2$) beginning from the rising time of this driving pulse, as shown in FIG. 10 (d). This specific time period is preliminarily determined based on the result of experiments.

Frequency square waves $H_p$ shown in FIG. 10 (a) are input to the AND gate 413 from the high-frequency generating unit 411, and AND gate 413 outputs the pulse signal $L_o$ which consists of high-frequency square waves only during the time period $t_1 - t_3$.

The pulse $P_o$ output from the one-shot-pulse unit 412 and the pulse signal $L_o$ output from the AND gate 413 are input to the OR gate 414, and output from the OR gate 414 is the driving pulse $D_r$ containing the pulse with a large duty ratio during the time period $t_1 - t_2$ (the forced time period $T_p$) and a pulse with a small duty ratio during the time period $t_2 - t_3$ (the limited time period $T_L$) are put out, as shown in FIG. 10 (e).

Accordingly, the time delay in the valve's closing can be shortened, and simultaneously the driving pulse $D_r$ most suitable for detecting the valve's closing time is formed.

Figure 11:
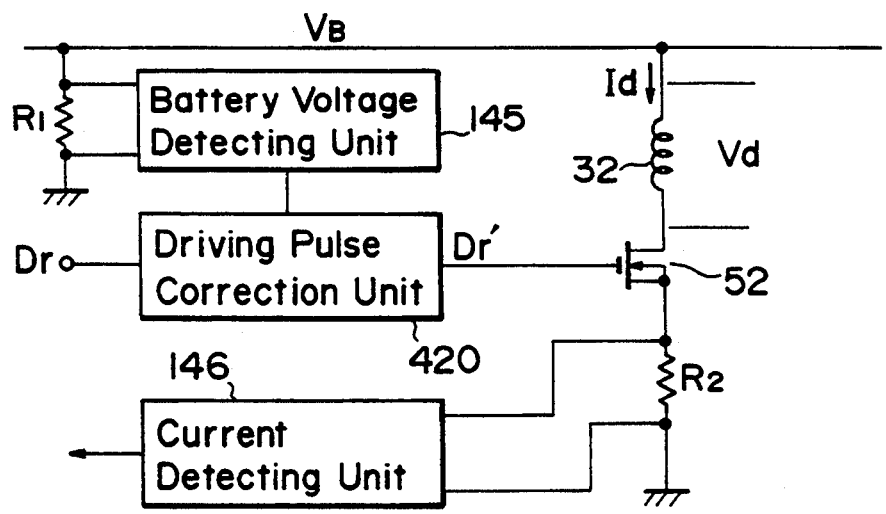
FIG. 11 is an electrical circuit diagram illustrating the drive of the solenoid by the output from the driving pulse correcting unit.
Figure 12:
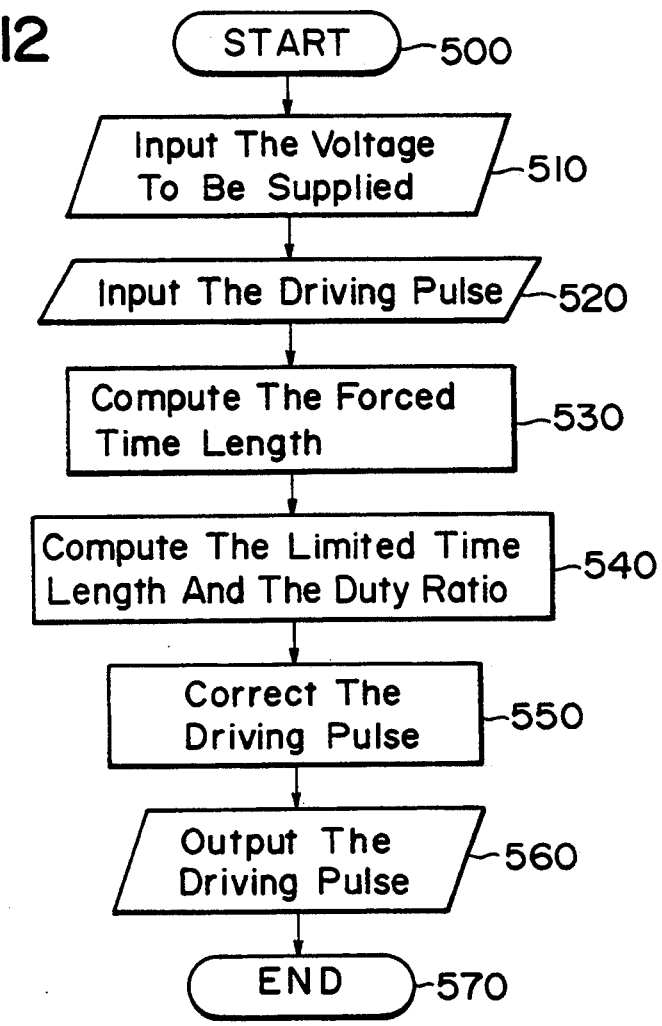
FIG. 12 is a flowchart for the processes carried out in the driving pulse correction unit.

This driving pulse $D_r$ is, according to the process in the flowchart of FIG. 12, corrected to the driving pulse $D_r'$ in a driving pulse correcting unit 420 having, for example, the structure shown in FIG. 11. This control begins at step 500, and in step 510, the voltage across of the resistor $R_1$ installed between the electrical source line of FIG. 11 and ground is converted into signals by a battery voltage detecting unit 145, and is input as the supplied voltage (battery voltage) $V_B$. In addition, in step 520, the aforementioned driving pulse $D_r$ is input.

Figure 13A:
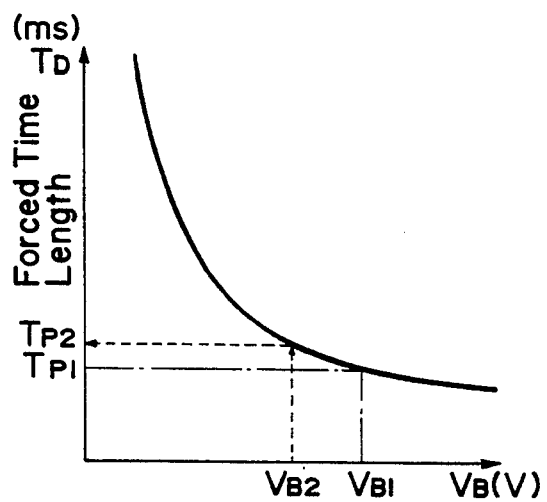
FIG. 13(a) is a characteristic diagram showing the supplied voltage and characteristics of the limited time length, and FIG. 13 (b) shows the supplied voltage and characteristics of the driving pulse's duty ratio in the limited time length.
Figure 13B:
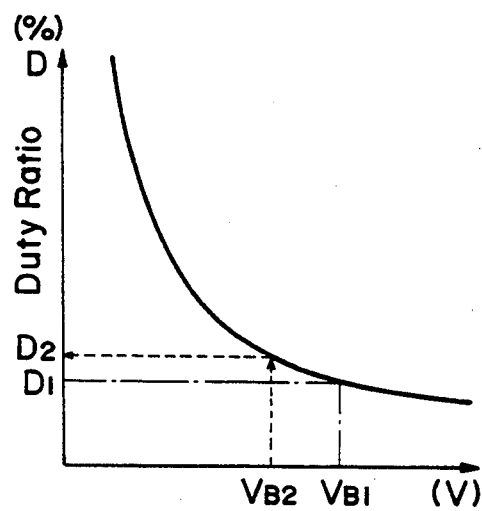

In step 530, the forced time period $T_p$ is computed from the voltage $V_B$, according to the characteristic map shown in FIG. 13 (a). With this characteristic, the forced time period becomes longer from $T_{p1}$ to $T_{p2}$, when the battery voltage $V_B$ has dropped from the rated voltage $V_{B1}$ to voltage $V_{B2}$, as shown in FIG. 13 (a). Since the forced time period $T_{L2}$ is the value obtained by subtracting the aforementioned forced time period $T_{p2}$ from the driving time period $T_d$, it becomes shorter by the same length as the extended period of the forced time period.

In step 540, the duty ratio D is computed from the battery voltage $V_B$, according to the characteristic diagram shown in FIG. 13 (b). With this characteristic, the duty ratio increases from $D_1$ to $D_2$ when the battery voltage $V_B$ has dropped from the rated voltage $V_{B1}$ to voltage $V_{B2}$.

In step 550, the driving pulse is corrected, on the basis of the processes in the aforementioned steps 530 and 540, and the corrected driving pulse $D_r'$ is formed. More specifically, if a difference between the forced time period $T_p$ and the driving pulse $D_r$ computed in step 530 is larger than a specific value, in order to adjust this difference, the difference between the forced time period $T_p$ computed in step 530 and the forced time period $T_p$ of the driving pulse $D_r$ is added to the forced time period $T_p$ of the driving pulse $D_r$, or the forced time period $T_p$ of the driving time pulse is replaced with the forced time period $T_p$ computed in step 530 to make the correction. If a difference between the duty ratio computed instep 540 and the duty ratio of the driving pulse $D_r$ is larger than a specific value, in order to adjust this difference, the difference between the duty ratio D computed in step 540 and the duty ratio of the driving pulse $D_r$ is added to the duty ratio of the driving pulse $D_r$, or the duty ratio of the driving pulse $D_r$ is replaced by the duty ratio D computed in step 540 to make the correction.

As to the method of correcting the driving pulse, it is possible to directly form the corrected driving pulse by inputting the output $D_p$ of pulse generating controlling unit 49 to the driving pulse correction unit 420, without installing the driving pulse forming unit 410, and by computing the forced time period $T_D$ and the duty ratio D from the characteristic diagram in FIG. 13, on the basis of the battery voltage $V_B$, as shown by the dotted line in FIG. 8.

This driving pulse $D_r'$ is, in Step 560, output from the gate terminal of the field effect transistor (FET) 52 shown to FIG. 11. Once this driving pulse $D_r'$ is input in the gate terminal of FET 52, the FET 52 conducts and therefore the current flows to solenoid 32, driving valve 23 in the direction of closing.

Figure 14:
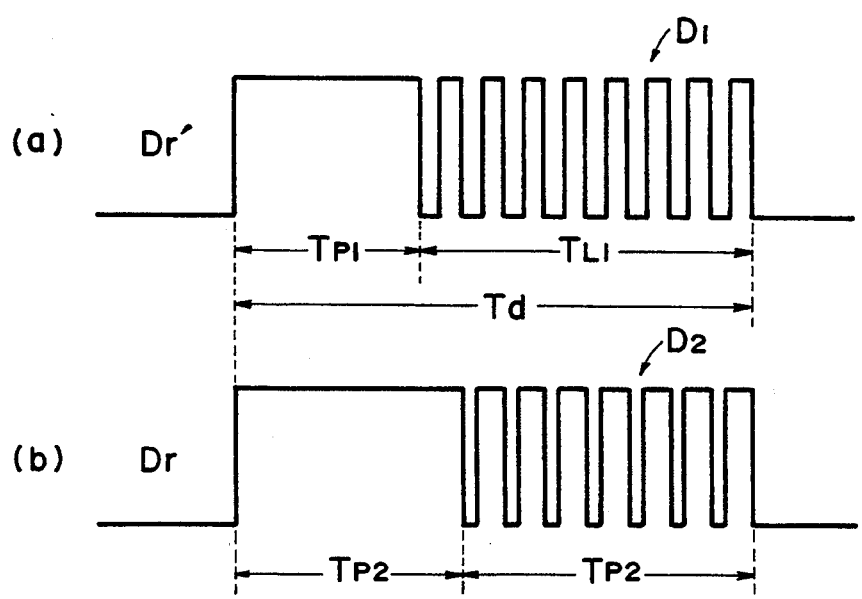
FIG. 14 (a) is a time chart showing the driving pulse at the time of rated voltage, and FIG. 14 (b) shows when the voltage is lower than the rated voltage.
Figure 15:
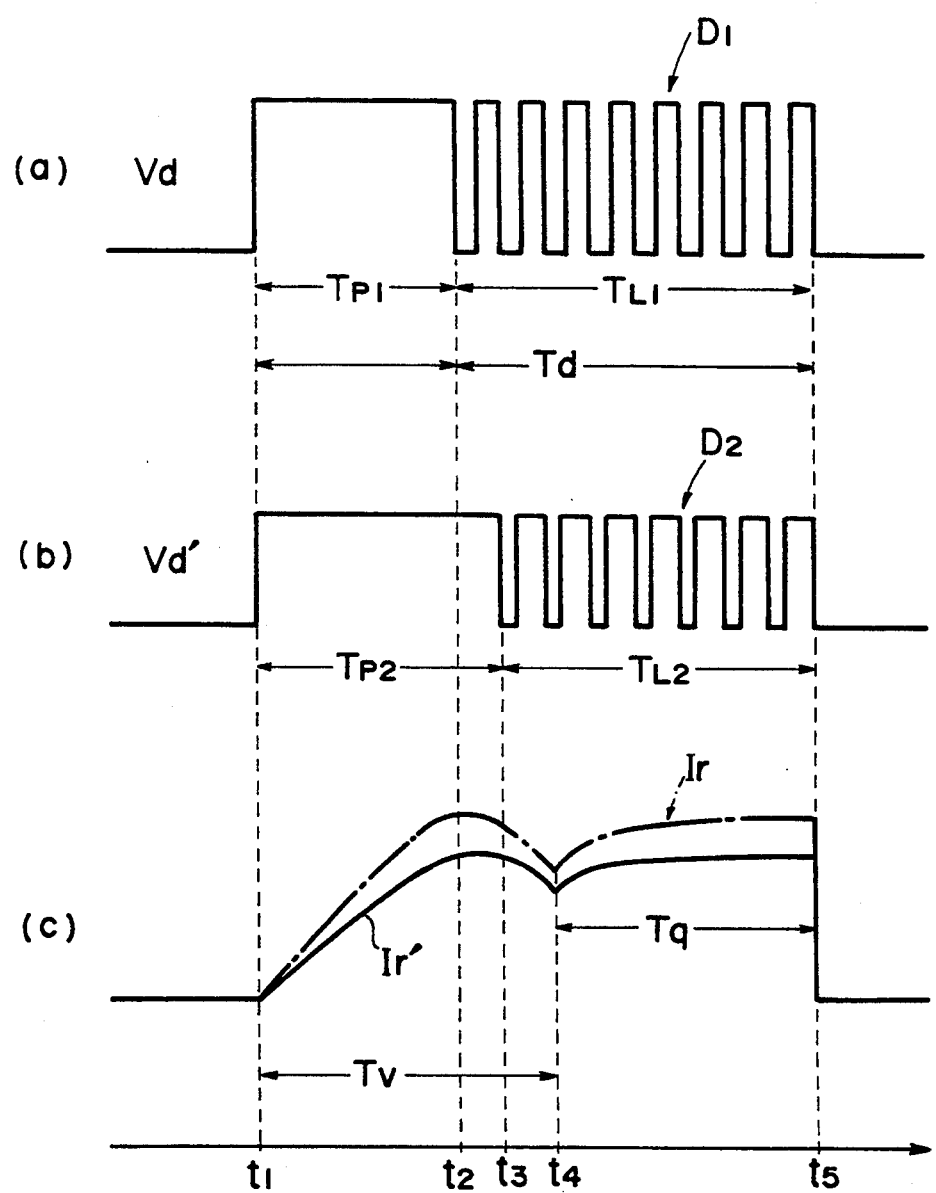
FIG. 15 (a) is a time chart showing the driving voltage at the time of rated voltage, FIG. 15 (b) a time chart showing when the voltage is lower than the rated voltage, and FIG. 15 (c) shows a time chart for the driving current.

Accordingly, since the driving pulse $D_r'$ at the time of rated voltage $V_{R1}$ shown in FIG. 14 (a) is composed of a driving pulse having a large duty ratio during the forced time period $T_{p1}$ and of a driving pulse having a duty ratio $D_1$ during the limited time period $T_{L1}$, the driving voltage $V_d$ changes to the level shown in FIG. 15 (a); therefore, in the beginning driving period of solenoid 20 when a greater driving force is needed, valve 23's motion can be accelerated by the pulses having a large duty ratio, while in the subsequent driving period when the valve's closing time needs to be detected, the changing point of the current (current inflection point) at the time of the valve 23's seating on valve seat 24 ($t_4$) can made clearly visible by reducing the actual voltage with pulses having a small duty ratio. The current $I_r$ at this time is shown by the dotted line in FIG. 15 (c).

If the battery voltage $V_B$ has dropped due to a drop of the battery capacity and declines to the voltage $V_{B2}$ which is lower than voltage $V_{B1}$, as shown in FIG. 14 (b), the driving voltage $V_d'$ will be the one shown in FIG. 15 (b), since the driving pulse $D_r'$ has the forced time period $T_{p2}$ for the driving pulse with a large duty ratio, corrected by the battery voltage $V_{B2}$ in the longer time period than the limited time period of the rated voltage, and has the limited time period $T_{L2}$ for a driving pulse with the duty ratio $D_2$ larger than the duty ratio $D_1$. Thus, the voltage drop is compensated for, and the driving force of the solenoid is secured; simultaneously, the current $I_r'$ will be as shown in FIG. 15 (c) and the longer seating time period which would be caused by the drop in the battery voltage $V_B$ can be prevented, because of the larger duty ratio for the limited time period.

The current detecting circuit 146 detects the current flowing in solenoid 32 through driving circuit 400, by detecting the voltage across the of resistor $R_2$ connected, in series, to solenoid 32, and outputs a signal corresponding to this current value; this signal is sent to seating detection unit 51 inside the control unit 40. This seating detecting unit 51 detects the seating time ($T_4$) by detecting the inflection point of the current waveform, as shown in FIG. 15 (c), and outputs a signals to the time delay computation unit 50 and pulse generation control unit 49.

In this example of the preferred embodiment, the case when the supplied voltage has dropped was explained. However, in the case when the supplied voltage has risen, the forced time period and the duty ratio of the driving pulse can be adjusted using the characteristic diagram. More specifically, when the supplied voltage has risen, the forced time period can be set short, and the duty ratio of the driving pulse for the forced time period can be set small in order to eliminate the inconveniences caused by the rise in the supplied voltage (difficulty in detecting the seating time point).

As explained above, according to this invention, the forced time period to shorten the solenoid valve's response time of the driving pulse Supplied to the solenoid, and the duty ratio of the driving pulse in the limited time period that makes the detection of the solenoid's valve'seating time easy, are corrected by the detected value of the electrical source voltage (battery voltage); therefore, the changes in the seating time caused by a drop or rise in the electrical source voltage can be prevented, and the responsiveness of stable injection can be secured against the changes in the supplied voltage.

The following explanation is provided for the example of control, wherein the driving pulse supplied to every solenoid is corrected, taking the voltage drop in the wire harness into account, and the non-uniform responsiveness of every solenoid is prevented.

Figure 16:
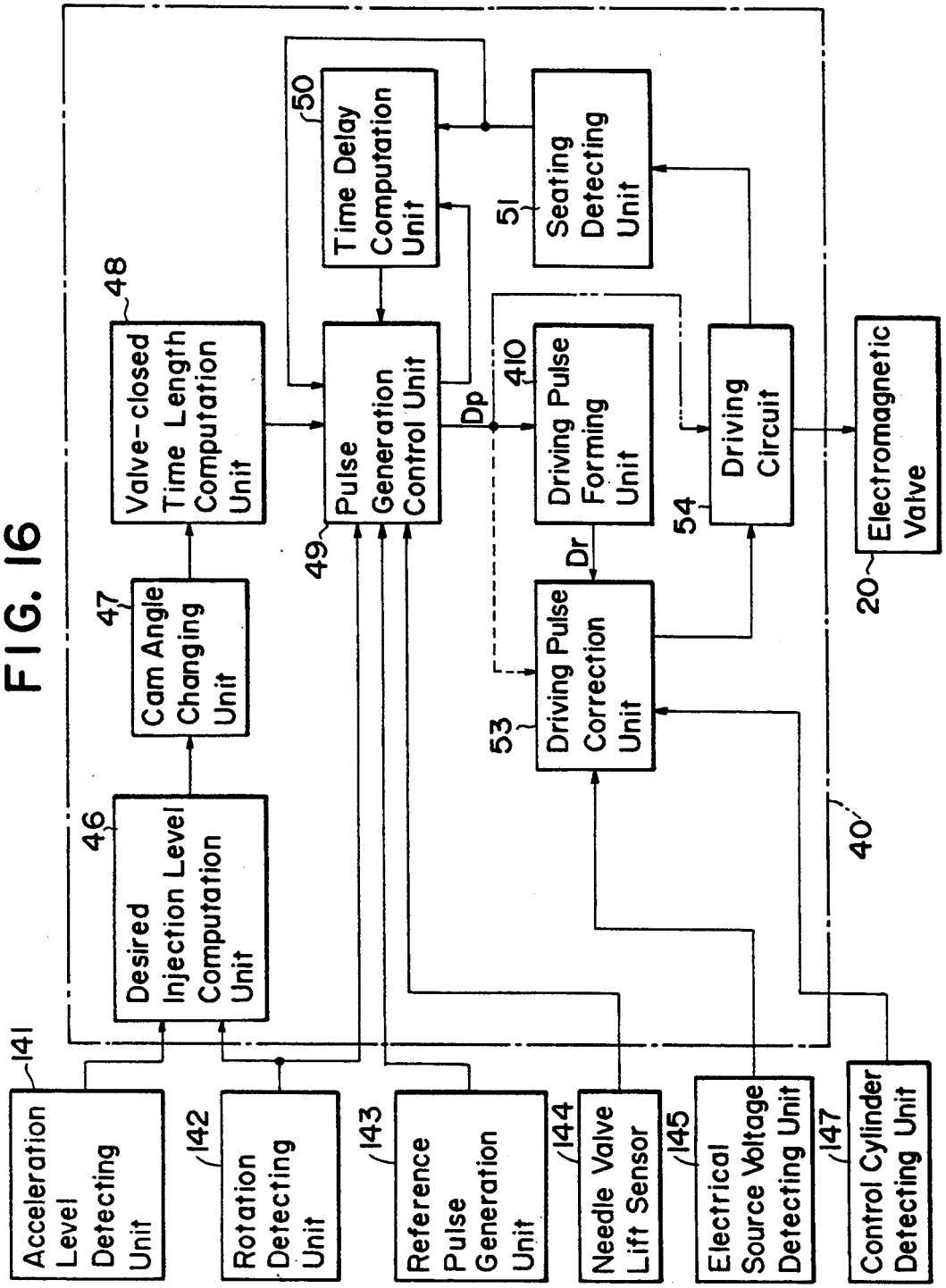
FIG. 16 is a functional diagram illustrating the control unit of the fuel-injection device in accordance with a preferred embodiment of the present invention.

Of the hardware structure of FIG. 1, control unit 40 to control solenoid valve 20 is shown in FIG. 16. Control unit 40 consists of an A/D converter, multiplexer, and microcomputer, which are not shown in the figure, and in the control unit 40, signals are input from each of an acceleration level detecting unit 141, and rotation detecting unit 142 to detect the rotational speed of engine, a reference pulse generating unit 143 that is attached to the driving shaft and generates pulses every time the driving shaft reaches a reference angle position, and needle valve lift sensor 144 to detect the lifting time of the needle valve, an electrical voltage detecting unit 145 to detect the electrical voltage (battery voltage), and from a controlled cylinder detecting unit 147 to detect the cylinders (controlled cylinders) that are controlled.

In FIG. 16, the processes carried out in the aforementioned control unit 40 are, for convenience, shown in a functional diagram. An explanation follows on the components which are not shown in the functional diagram of FIG. 8. In other words, the desired injection level computation unit 46, cam angle conversion unit 47, valve-closed time length computation unit 48, pulse generation control unit 49, time delay computation unit 50, and seating detection unit 51 are the same as shown in FIG. 8, and are therefore not explained.

The driving pulse $D_p$ formed by the pulse generation control unit 49 is input to the driving pulse forming unit 410, where the reference driving pulse $D_r$ is formed based on this driving pulse $D_p$. The driving pulse forming unit 410 is, for example, similar to that shown in FIG. 9. As shown in FIG. 10 (e), the driving pulse $D_r$ is composed of a driving pulse having a large duty ratio (100% in this case) for the time period (forced time period $T_p$) and a driving pulse having a small duty ratio for the time period (limited time period $T_L$), and is formed in this unit. As explained above, this driving pulse $D_r$ is formed to shorten the time delay in valve's seating by the driving pulse of the forced time period, and to make the detection of the solenoid valve's seating time point easier by the driving pulse of the limited time period.

Figure 17:
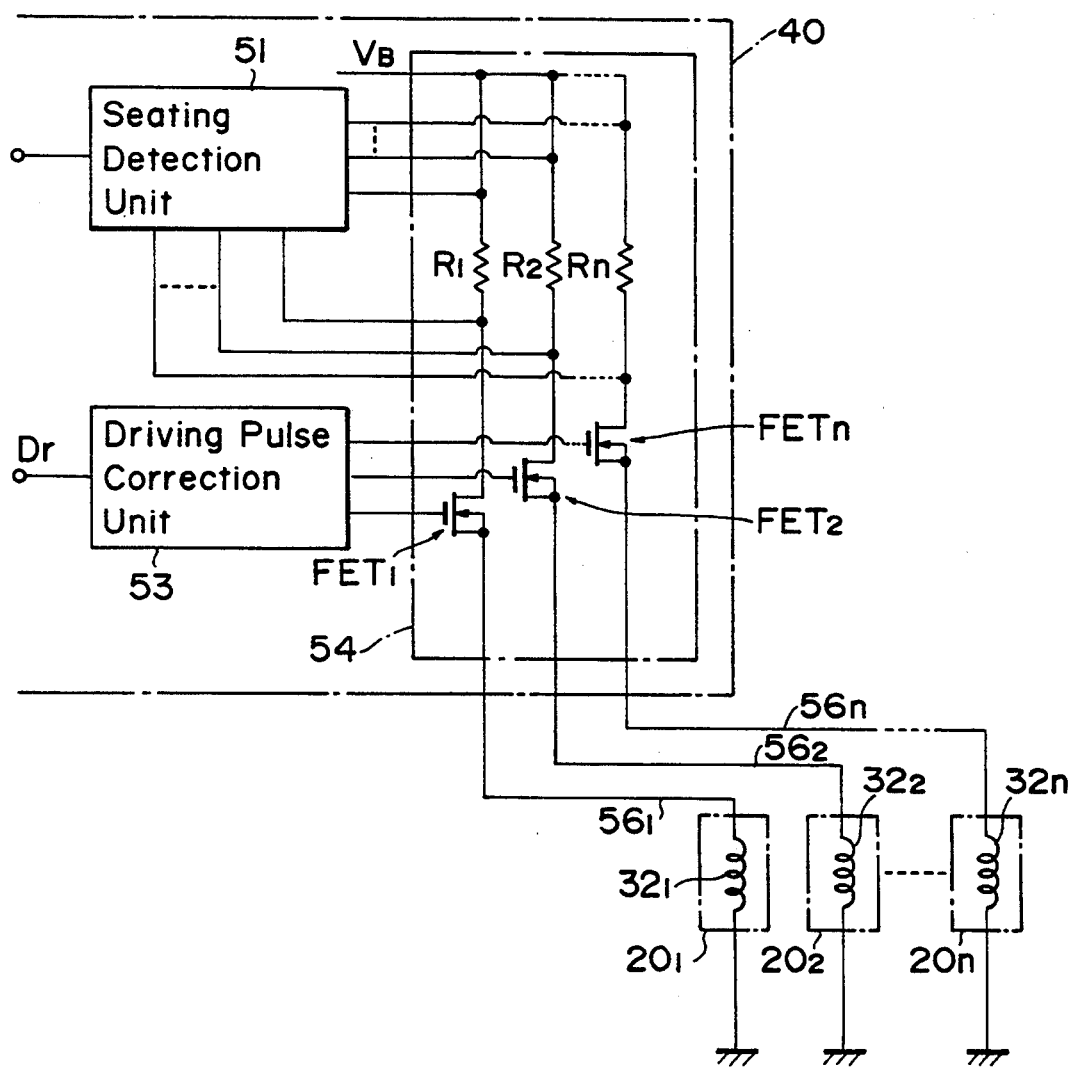
FIG. 17 is an electrical circuit diagram showing the driving circuit and one example of the circuit leading to each solenoid.

This driving pulse $D_r$ is, as shown in FIG. 17, corrected by a driving pulse correction unit 53 mentioned below, according to a specific program, and input to the driving circuit 54.

This driving circuit 54 consists of field-effect transistors $FET_1$, $FET_2$, ..., $FET_n$ that are connected, via wire harnesses $56_1$, $56_2$, ..., $56_n$, to solenoids $32_1$, $32_2$, ..., $32_n$ of solenoid valves $20_1$, $20_2$, ..., $20_n$ assigned for every solenoid respectively, and to resistors $R_1$, $R_2$, ..., $R_n$ to detect the current flowing in these field-effect transistors $FET_1$, $FET_2$, ..., $FET_n$, and the driving pulses $D_{r1}$, $D_{r2}$, ..., $D_{rn}$, corrected by the driving pulse correcting unit 53, are input to the gates of $FET_1$, $FET_2$, ..., $FET_n$ respectively to make each circuit conductive.

By the voltage across of the resistors $R_1$, $R_2$, ..., $R_n$, the current flowing in each resistor $R_1$, $R_2$, ..., $R_n$ is detected, and from this current value, the seating detection unit 51 detects the minimal value of the current value required for the solenoid valve to be seated to detect the solenoid valve's seating time.

The correction of the driving pulse $D_r$ effected in the driving pulse correcting unit 53 is shown in a flowchart in FIG. 18, which is explained below.

In the correction of the driving pulse started in step 600, the information on which cylinder is to be controlled this time, out of the cylinders detected by the controlled cylinder detecting unit 147, is input (the k-th cylinder), and the value $\alpha$ of the electrical source voltage (battery voltage) $V_B$ is input in step 620, which is followed by step 630 to input the driving pulse $D_r$.

Figure 19A:
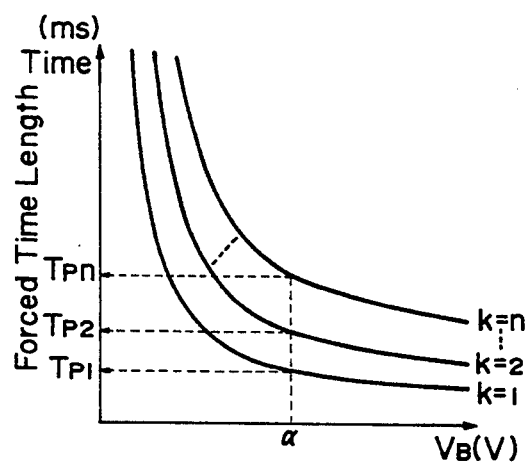
FIG. 19 (a) is a characteristic mapping graph showing the relationship between the electrical source voltage and the forced time length in each cylinder, and FIG. 19 (b) shows the relationship between the electrical source voltage and the duty ratio in the limited time length.
Figure 19B:
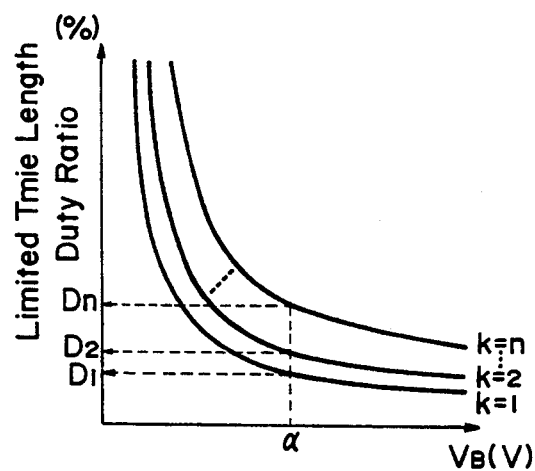

In step 640, the forced time period $T_p$ is computed from the electrical source voltage $V_B$, based on the characteristics of the k-th cylinder, according to the diagram prepared in FIG. 19 (a). More specifically, if the controlled cylinder is the first cylinder, the forced time period $T_{p1}$ is obtained from the value $\alpha$ of the electrical source voltage $V_B$, based on the characteristic indicated by k=1. If the controlled cylinder is the second cylinder, the forced time period $T_{p2}$ is obtained likewise, and if it is the n-th cylinder, the forced time period $T_{pn}$ is obtained. Accordingly, the farther the cylinder's position is to the driving circuit 54, the longer its forced time period is.

In step 650, the duty ratio of the driving pulse in the limited time period $T_L$ is computed from the electrical source voltage $V_B$, based on the characteristic of the k-th cylinder, according to the diagram in FIG. 19 (b). More specifically, if the controlled cylinder is the first cylinder, the duty ratio $D_1$ is obtained from the value of the electrical source voltage $V_B$, based on the characteristic indicated by k=1. If the controlled cylinder is the second cylinder, the duty ratio $D_2$ is obtained, likewise, and in the case of the n-th cylinder, the duty ratio $D_n$ is obtained. Accordingly, the farther the cylinder's position is to the driving circuit 54, the larger its duty ratio is. The steps 640 and 650 surrounded by the broken line in FIG. 18 will function as driving pulse correction computation step 680.

Figure 20:
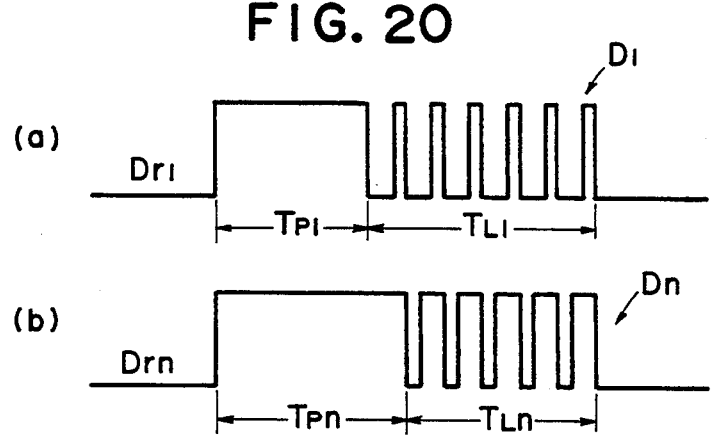
FIGS. 20 (a) and 20 (b) are a time chart showing the driving pulse in the first cylinder (a) and the nth cylinder (b) when the forced time length and the duty ratio of driving pulse in the limited time length are corrected.

In step 660, the driving pulse $D_r$ is corrected, on the basis of the force time period $T_p$, which are $T_p$, $T_{p2}$, ..., $T_{pn}$, computed in the step 640, of the limited time period $T_L$ determined by the forced time period $T_p$ and by the driving pulse width $T_d$, and of the duty ratio $D_1$, $D_2$, ..., $D_n$ in the limited time period, computed in the step 650. More specifically, if the controlled cylinder is the first cylinder nearest to the driving circuit 54, the driving pulse $D_r$ has the forced time period $T_{p1}$ and the limited time period $T_{L1}$, as shown in FIG. 20 (a), and is corrected to driving pulse $D_{r1}$, the duty ratio of which is $D_1$ in the limited time period. If the controlled cylinder is the nth cylinder farthest to the driving circuit 54, the driving pulse $D_r$ has the forced time period $T_{pn}$ and the limited time period $T_{Ln}$, and is corrected to the driving pulse $D_{rn}$, the duty ratio of which is $D_n$, as shown in FIG. 20 (b).

There are various processes to correct the driving pulse, on the basis of forced time period $T_p$ computed in step 640, and of the duty ratio in the limited time period computed in step 650. However, if a difference between the forced time period computed in the aforementioned step 640 and the forced time period of the pulse $D_r$ exceeds a specific value, in order to adjust the difference, the difference between the forced time period computed in step 640 and the forced time period of the driving pulse $D_r$ is added to the forced time period of the driving pulse $D_r$, or the forced time period of the driving pulse $D_r$ is replaced by the forced time period computed in step 640 to make the correction. If a difference between the duty ratio computed in step 650 and the duty ratio of the driving pulse $D_r$ exceeds a specific value, in order to adjust the difference, the difference of the duty ratio computed in step 650 and of the duty ratio of the driving pulse $D_r$ is added to the duty ratio of the duty pulse $D_r$, or the duty ratio of the driving pulse $D_r$ is replaced by the duty ratio $D$ computed in step 650. As to the method of correcting the driving pulse, the output $D_p$ of pulse generation control unit 49 may be input directly to the driving pulse correcting unit 53 without installing the driving pulse forming unit 410, as shown by the dotted line in FIG. 16, and the corrected driving pulse may be directly formed, by computing the forced time period and the duty ratio for every cylinder from the characteristic diagram shown in FIG. 19.

The corrected driving pulses $D_{r1}$, $D_{r2}$, ..., $D_{rn}$ are output from driving circuit 54 in step 670. The driving voltage input to each solenoid valve $20_1$, $20_2$, ..., $20_n$, after the voltage is dropped in each of the wire harnesses $56_1$, $56_2$, ..., $56_n$, becomes uniform when charged input to each of the solenoids $32_1$, $32_2$, ..., $32_n$ of the respective solenoid valve $20_1$, $20_2$, $20_n$. Therefore, the driving current flowing each of the solenoids $32_1$, $32_2$, ..., $32_n$ is uniform, making the responsiveness of each of the solenoid valves $20_1$, $20_2$, ..., $20_n$ uniform.

Figure 18:
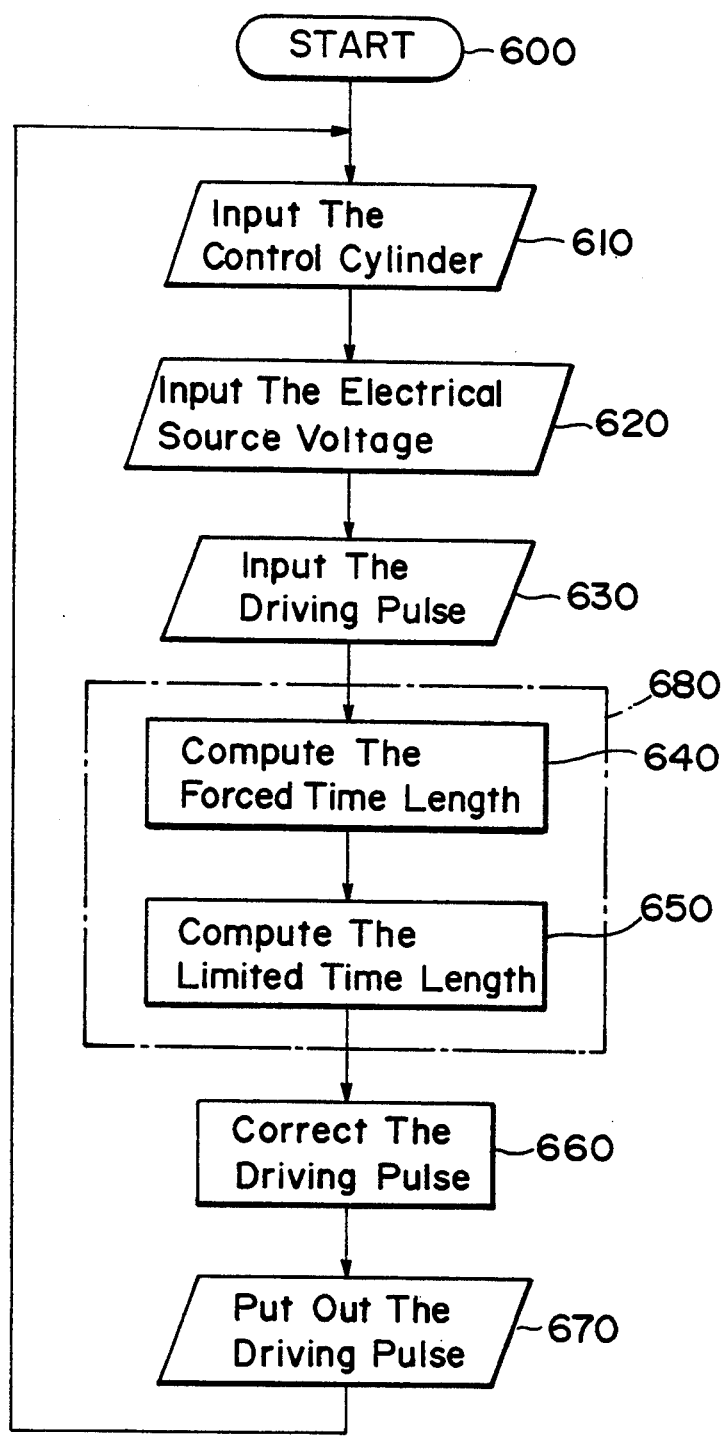
FIG. 18 is a flowchart showing the control of the driving pulse correction unit.

In the aforementioned example of the preferred embodiment, the correction of the driving pulse having the forced time period and the limited time period was explained; however, when the aforementioned pulse $D_r$ is directly input to driving circuit 54, the driving voltage is computed, as shown by the broken line in FIG. 16, and as shown by the broken line in FIG. 18 for step 680.

Figure 21:
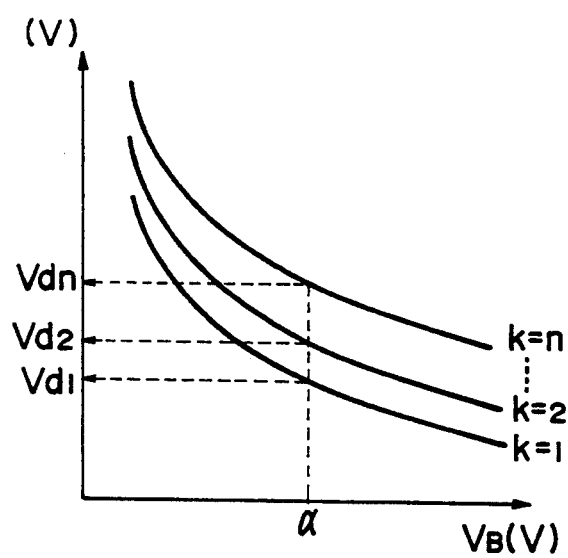
FIG. 21 is a characteristic mapping graph showing the relationship between the electrical source voltage and the driving voltage in each cylinder.

More specifically, the driving voltage is computed from the value $\alpha$ of the electrical source voltage $V_B$, based on the characteristic of the k-th cylinder shown in FIG. 21. For example, in the case of the first cylinder, the driving voltage $V_{d1}$ is computed from the characteristic k=1; in the case of the second cylinder, the driving voltage $V_{d2}$ is computed from the characteristic of k=2; in the case of the n-th cylinder, the driving voltage $V_{dn}$ is computed; the driving voltage grows larger in this order from the first to n-th cylinder.

Figure 22:
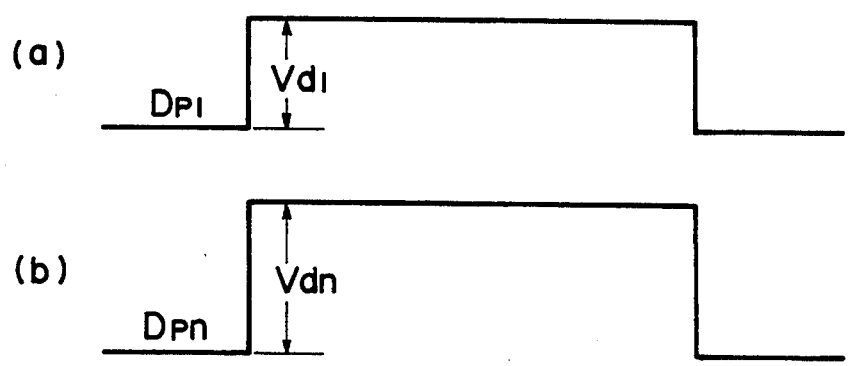
FIGS. 22 (a) and 22 (b) are a time chart for the driving pulse charged in the first cylinder (a) and the nth cylinder (b) when the driving voltage is corrected.

Accordingly, in step 660, the driving pulse Dp is corrected to driving pulse Dp1 of driving voltage Vd1, in the case when the controlled cylinder is the nearest one to driving circuit 54, as shown in FIG. 22 (a), and in the case when the controlled cylinder is the n-th one farthest to the driving circuit 54, the driving pulse $D_p$ is corrected to the driving pulse $D_{pn}$ of the driving voltage $V_{dn}$ wherein the driving voltage grows higher for every cylinder, beginning with the first cylinder, as shown in FIG. 22 (b). Therefore, the same effect as explained in the aforementioned example can be obtained.

Figure 23:
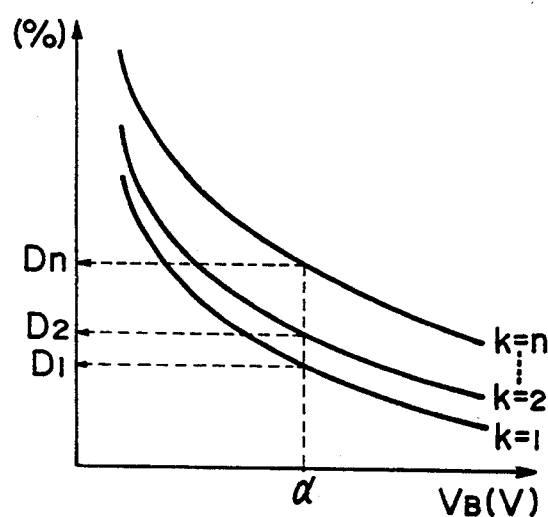
FIG. 23 is a characteristic mapping graph showing the relationship between the electrical source voltage and the duty ratio in each cylinder.

When the driving pulse is composed of pulses having a specific ratio, the duty ratio is computed in step 680. More specifically, the duty ratio of the driving pulse is computed from the value $\alpha$ of the electrical source voltage $V_B$ based on the characteristic of the k-th cylinder shown in FIG. 23. For example, in the case of the first cylinder, the duty ratio $D_1$ is computed from the characteristic of k=1; in the case of the second cylinder, the duty ratio $D_2$ of the driving pulse is computed from the characteristic of k=2; in the case of n-th cylinder, the duty ratio $D_n$ of the driving pulse is computed.

Figure 24:
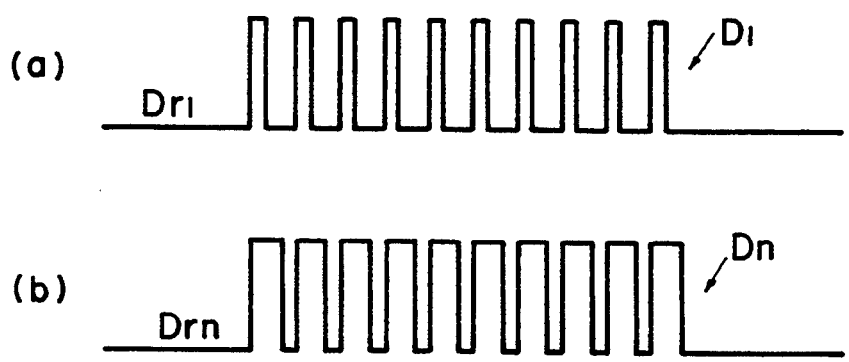
FIGS. 24 (a) and 24 (b) are a time chart for the driving pulse charged in the first cylinder (a) and the nth cylinder (b) when the duty ratio is corrected.

Accordingly, in step 660, the driving pulse $D_r$ is, as shown in FIG. 24 (a), corrected to the driving pulse $D_{r1}$ with the duty ratio $D_1$ in the case when the controlled cylinder is the first cylinder that is the nearest to driving pulse 54, and in the case when the controlled cylinder is the n-th cylinder that is farthest to driving circuit 54, the driving pulse $D_r$ is, as shown in FIG. 24 (b), corrected to the driving pulse $D_{rn}$ with the duty ratio $D_n$ which is set larger than that of the first cylinder, and increases for every cylinder; thereby the same effect as in the example of the preferred embodiment can be obtained.

As explained above, according to the present invention, the capacity of the driving pulse inputted to every solenoid valve is corrected, corresponding to the voltage drop in each wire harness between the solenoid valve installed on the fuel-injection pump for each cylinder and the driving circuit to drive the solenoid valve; therefore, the driving voltage in each solenoid can be uniform, and the responsiveness of every solenoid valve can be uniform, which makes it possible to maintain a uniform level of injection pressure and injection amount for the fuel-injection pump.

The following explanation is provided for the example, wherein the non-uniformity in the time delay in valve's closing, that is unique with every solenoid, is corrected, and the responsiveness of each solenoid is made to be uniform.

Figure 25:
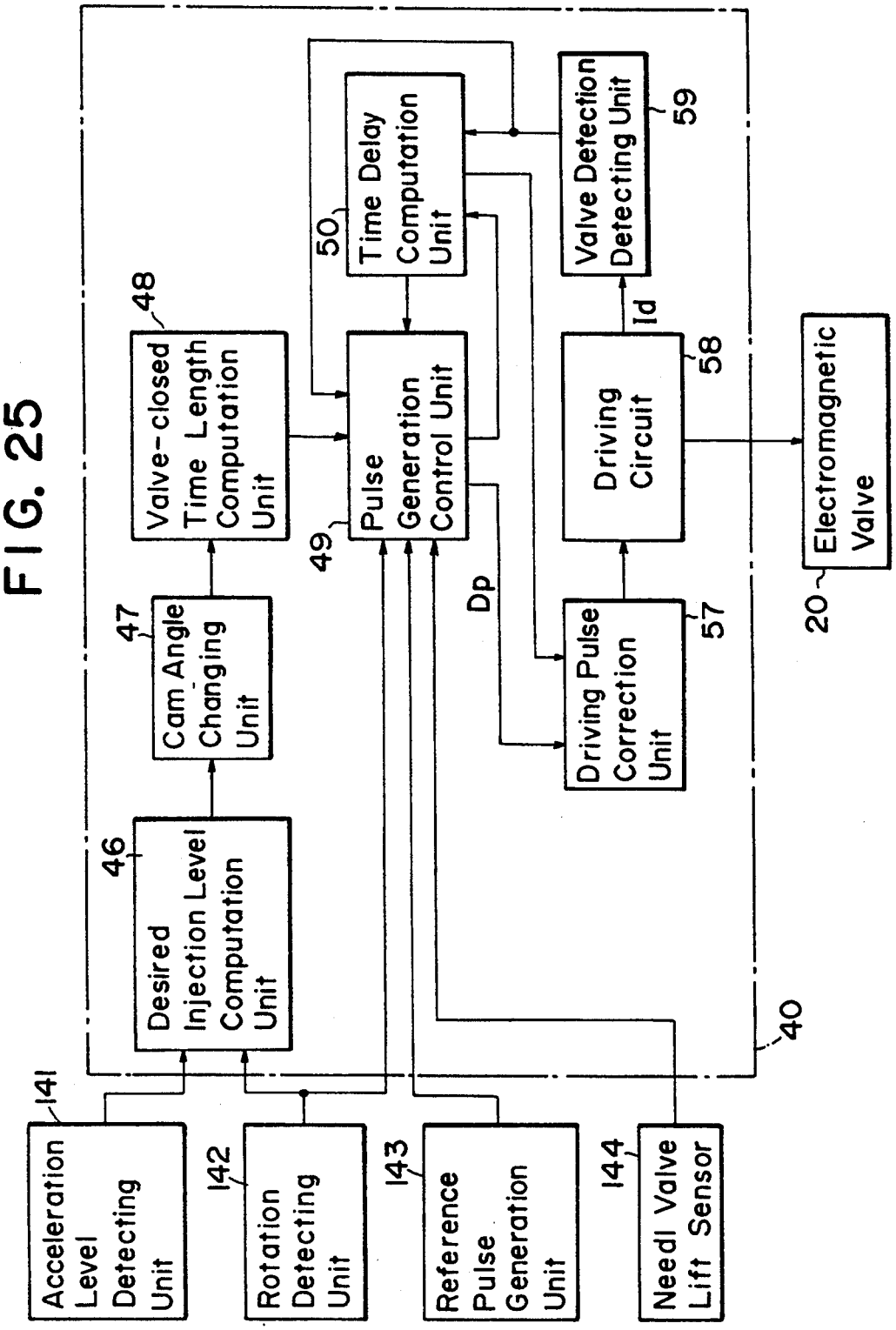
FIG. 25 is a functional diagram illustrating the control unit of the fuel-injection device in accordance with a preferred embodiment of the present invention.

Of the hardware of FIG. 1, control unit 40 is illustrated in FIG. 25 to show the control of solenoid valve 20. Control unit 40 consists of an A/D converter, multiplexer, and microcomputer, which are not shown in the figure. In this control unit, signals are input from each of an acceleration level detecting unit 141 that detects a pushing level of the acceleration pedal (accelerator level), a rotation detection unit 142 that detects the engine rotational speed, a reference pulse generation unit 143 that is attached to a driving shaft and generates the pulse every time the driving shaft reaches a reference angle position, and from a needle valve lift sensor 144 that detects the needle's lifting time.

In FIG. 25, the processes carried out in the aforementioned control unit 40 are shown, for convenience, by a functional diagram. The following explanation is given on the components which are not shown in FIG. 2. In other words, the desired injection level computation unit 46, cam angle conversion unit 47, valve-closed time length 48, pulse generation control unit 49, and time delay computation unit 50 are the same as shown in FIG. 2 and are therefore not explained again here.

The driving pulse $D_p$ formed in pulse generation control unit 49 is input to driving pulse correcting unit 57, mentioned below, and after being processed according to the prescribed program, is input to the driving circuit 58 to control the solenoid valve 20. The driving current $I_d$ flowing in the solenoid 32 due to the driving pulse input to the solenoid 32 of the solenoid valve 20, through this driving circuit 58, is input to the actual valve's closing detection unit 59, where the seating time is detected based on the minimal value of the current which is lowered at the time when the solenoid valve 20 seats; the signal that indicates the time point of this seating is sent input to the pulse generation control unit 49 and time delay computation unit 50, where the time point of the driving pulse $D_p$'s rising and the time delay in the valve's closing $T_v$ are computed.

Figure 26:
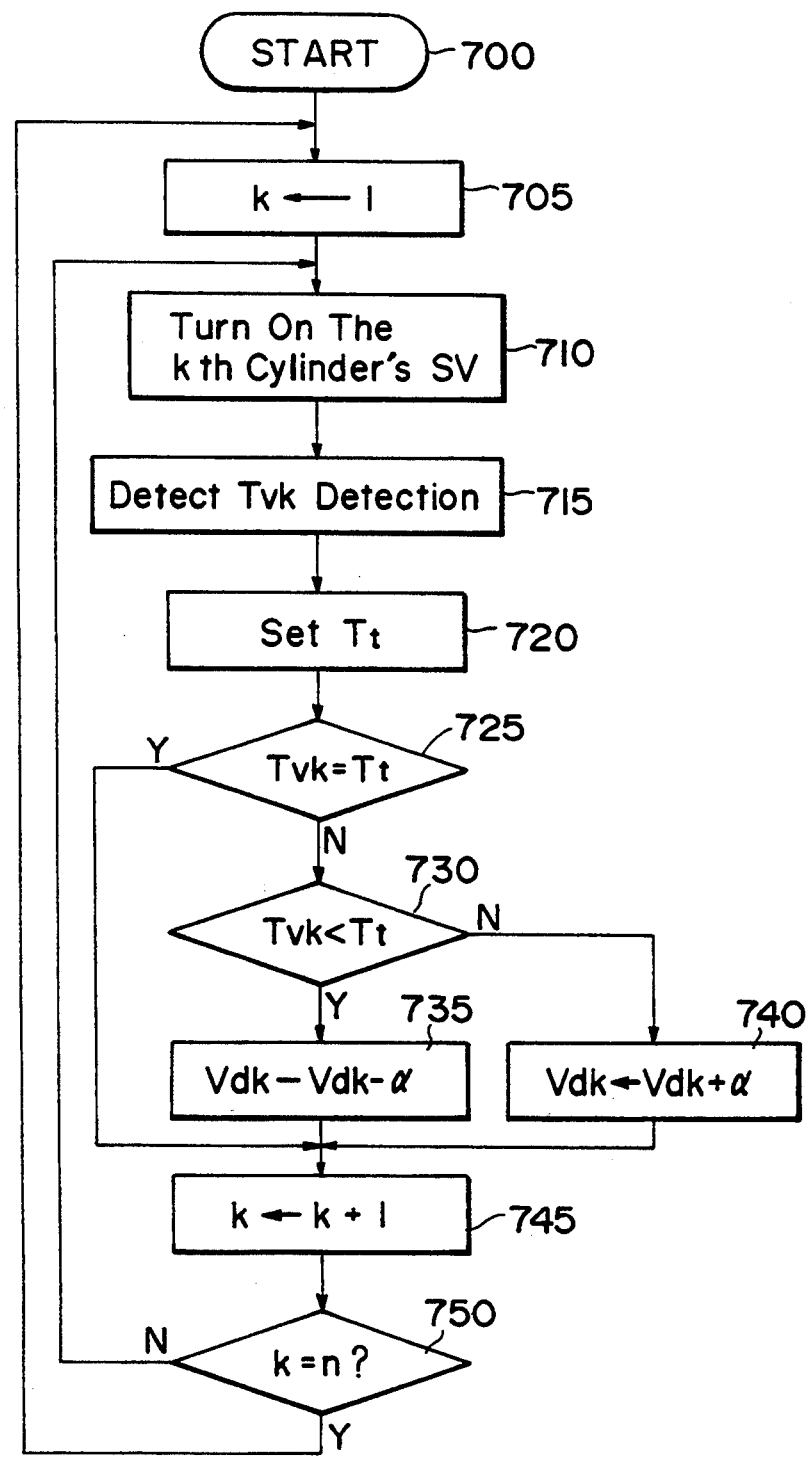
FIG. 26 is a flowchart for the driving pulse correction unit in accordance with a preferred embodiment of the present invention.

In the driving pulse correction unit 57, the driving pulse $D_p$ is corrected, according to the flowchart shown in FIG. 26. The following explanation is provided for this flowchart.

The driving pulse correction control that begins at step 700 is initiated in step 705, by defining the variable k as 1, and in step 710, the cylinder designated by this variable k is turned on; first, the first solenoid valve (SV) is turned on by the driving pulse from the driving voltage $V_{d1}$.

In step 725, a determination is made as to whether or not the time delay $T_{v1}$ in the closing of the first cylinder's solenoid valve and the desired time delay in the valve's closing are equal, and if it is not equal (N), in step 730, the amount of the time delay $T_{v1}$ in closing of the first cylinder's solenoid valve and that of the desired time delay in valve's closing $T_t$ are compared ($T_{v1} < T_t$). If the time delay $T_{v1}$ in closing of the first cylinder's solenoid valve is found smaller (Y) than the desired time delay in valve's closing $T_t$ in this comparison (Y), the driving pulse's driving voltage $V_{d1}$ is reduced by the prescribed value ($\alpha$) in step 735.

If the time delay $T_{v1}$ in closing of the first cylinder's solenoid valve is found greater (N) than the desired time delay $T_t$ in valve's closing in step 730, the driving pulse's driving voltage $V_{d1}$ is raised by the prescribed value ($\alpha$).

Subsequently, in step 245, 1 is added to the aforementioned variable k (k←k+1), and in step 750, this number is compared with the designated cylinder number (n). If this number is smaller than the cylinder's number (n), the process goes back to step 710, and the aforementioned process is continued until the number reaches the n cylinder. If the number reaches the n cylinder, the process goes back to step 705, and the process is repeated from the first cylinder.

Figure 27:
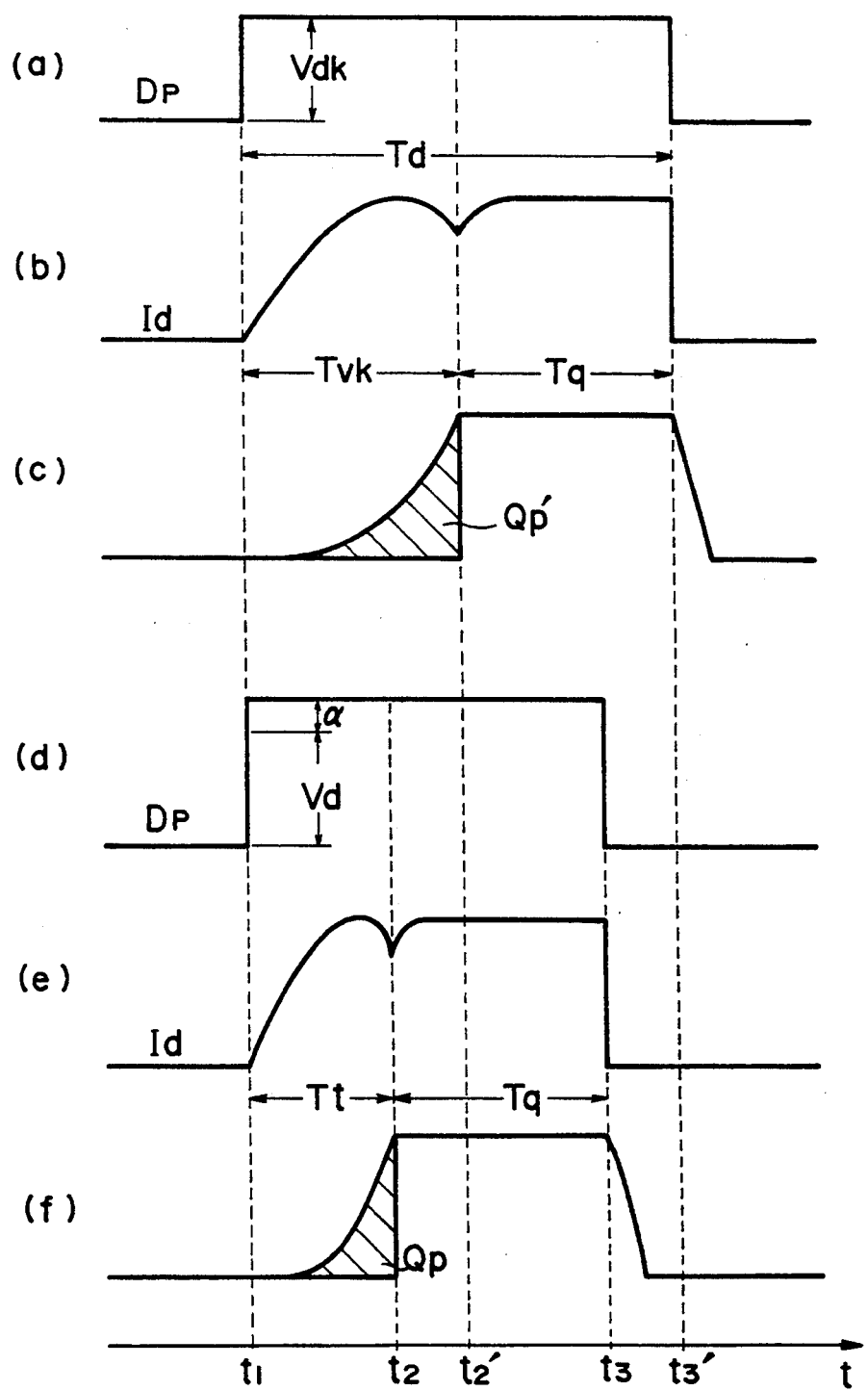
FIGS. 27 (a)–(f) are a time chart for the case when the driving pulse is set higher in the driving pulse correction unit.

Accordingly, when the driving pulse $D_p$ of the driving voltage $V_{dk}$, shown in FIG. 27 (a), is input to the solenoid 32 of the solenoid valve 20 mounted on the designated cylinder (the k-th cylinder), the time delay $T_{vk}$ in closing of this cylinder's solenoid valve ($t_1 - t_2'$) is detected, and the width Td of the driving pulse Dp becomes the value ($t_1 - t_3'$), which is the sum of the time delay in the valve's closing $T_{vk}$ and the valve-closed time $T_q$. Thus, the preflow becomes the amount $Q_p'$ indicated by the diagonal line in FIG. 27 (c), which is greater than the desired preflow amount, so the value of the driving voltage $V_{dk}$ for the driving pulse $D_p$ is corrected by the prescribed value $\alpha$, as shown in FIG. 27 (d).

FIG. 27 (b) shows the driving current $I_d$ flowing in the solenoid 32 of the solenoid valve 20 mounted on the designated cylinder (the k-th cylinder) when the driving pulse shown in FIG. 27 (a) is charged. FIG. 27 (e) shows, likewise, the driving current $I_d$ flowing in the solenoid valve 32 when the driving pulse shown in FIG. 27 (d) is charged. The time point of the solenoid valve's seating ($t_2$, $t_2'$) is detected by the minimal value of this current caused by the drastic drop in the current.

Figure 28:
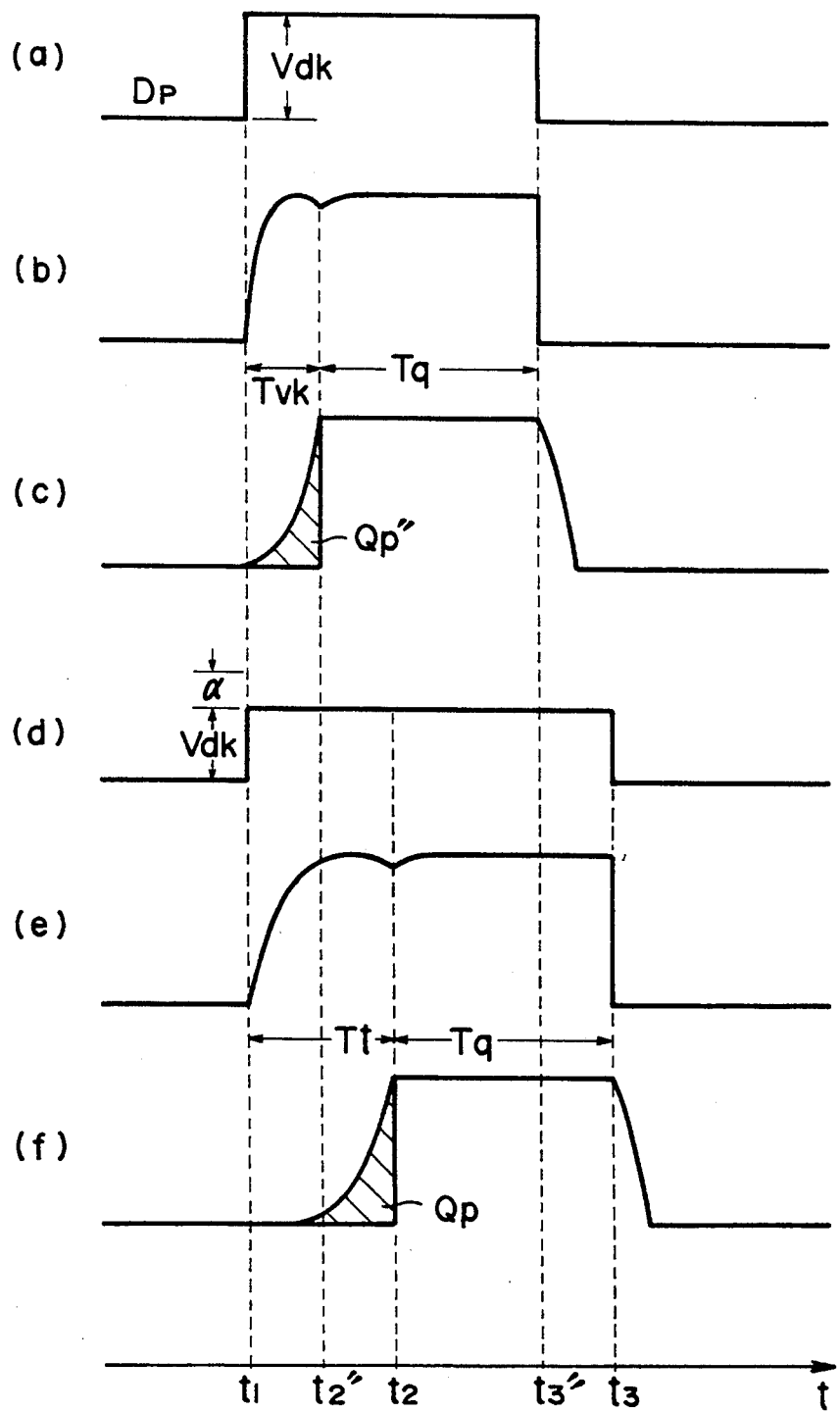
FIGS. 28 (a)–(f) are a time chart for the case when the driving pulse is set lower in the driving pulse correction unit.
Figure 29:
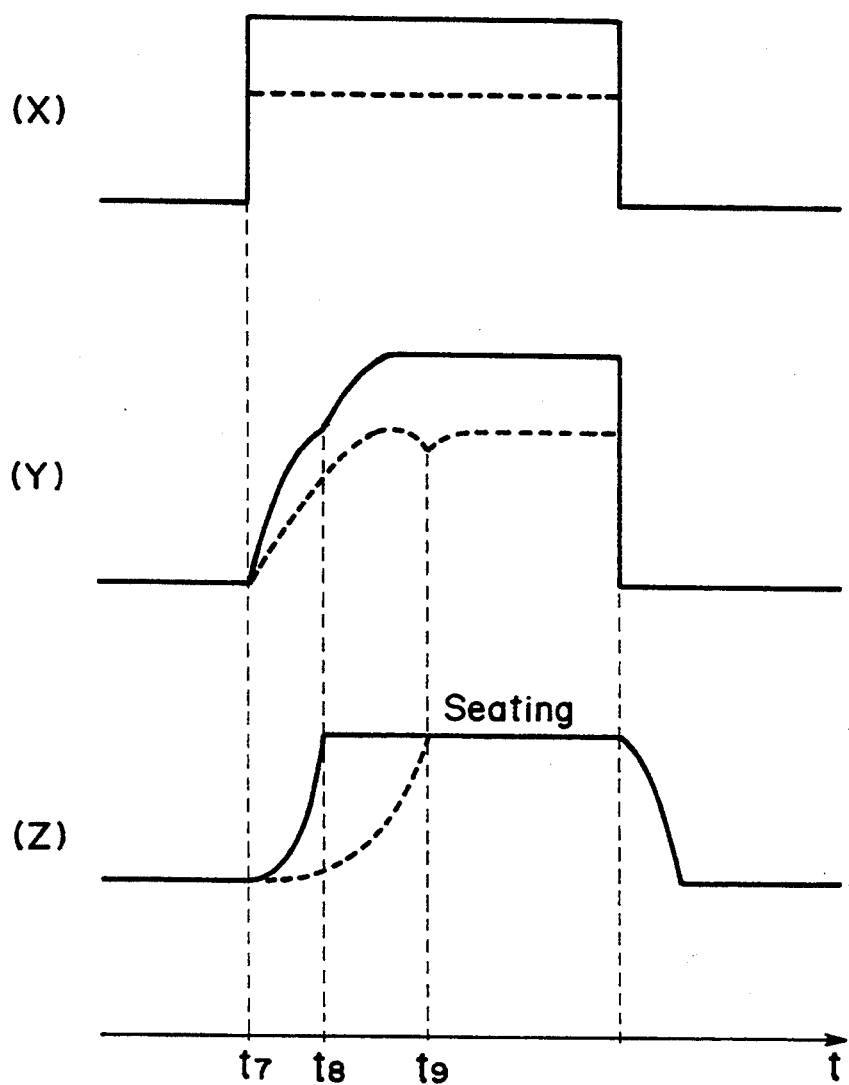
FIGS. 29 (x)–(z) are a time chart showing the driving voltage (X), driving current (Y), and valve's motion (Z) in a prior art system.
Figure 30:
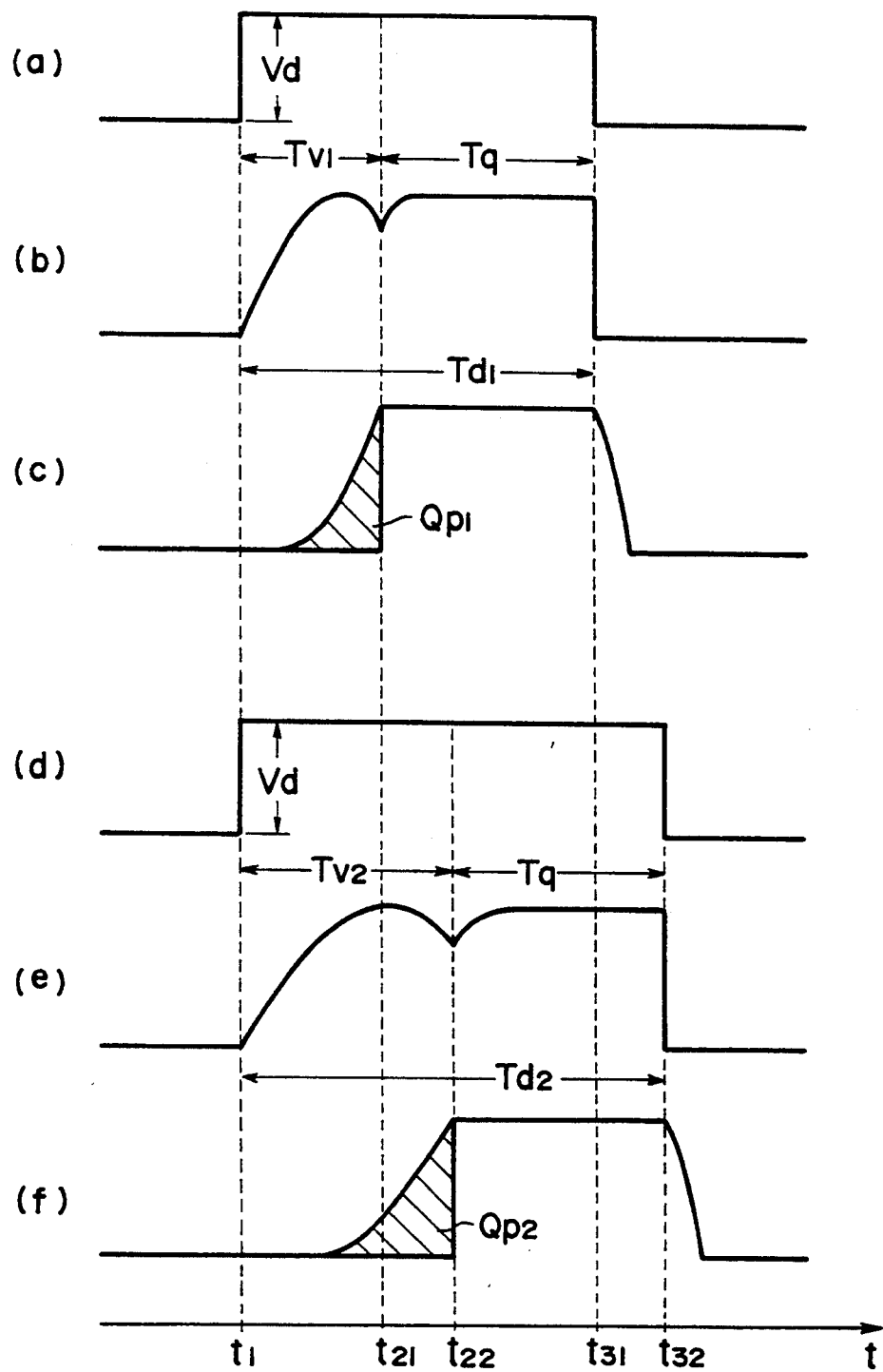
FIGS. 30 (a)–(f) are a time chart showing the driving pulses in prior art system.

On the contrary, when the driving pulse $D_r$ of the driving voltage $V_{dk}$, shown in FIG. 28 (a), is input to the solenoid 32 of the solenoid valve 20 mounted on the prescribed cylinder (the k-th cylinder), and the detected time delay in valve's closing $T_{vk}$ ($t_1 - t_2''$) is resultantly short, the preflow $Q_p''$ decreases, as shown in FIG. 28 (c), and the driving pulse width $T_d$ is Shortened to $t_1 - t_3''$. In addition, the detection of the minimal value ($t_2''$) of the driving current $I_d$ that detects the seating, shown in FIG. 28 (b), becomes difficult, so the driving voltage $V_{dk}$ is corrected, by the prescribed value, to the smaller value, as shown in FIG. 28 (d).

Accordingly, since the time delay in the valve's closing $T_{vk}$ equates with the desired time delay in the valve's closing $T_t$, the driving pulse $D_p$ having the prescribed pulse width ($t_1 - t_3$) can be obtained as well as the prescribed preflow $Q_p$. In addition, in this example of the preferred embodiment, the explanation was provided, on the basis of the method of correcting the driving voltage for the driving pulse; however, with the device to control the solenoid valve by the duty ratio of the driving pulse, the same effect can be obtained by changing the duty ratio of the driving pulse. More specifically, if the time delay in valve's closing is long, the driving pulse will be corrected to make the duty ratio greater, and if the time delay in valve's closing is short, the driving pulse will be corrected to make the duty ratio smaller.

As explained above, according to the present invention, the time delay in closing of the solenoid valve installed on every fuel-injection pump for every cylinder is detected, and the voltage for the driving pulse of the solenoid valve or the duty ratio is corrected, according to this detected value; therefore, the time delay in every valve's closing can be uniform, by which the preflow and pulse width can be uniform in every solenoid valve, making the responsiveness of the solenoid valve uniform, and making the injection amount and pressure of the fuel injection pump uniform for every cylinder.

What is claimed is:

1. A fuel injection device comprising:
   a fuel-injection pump for an engine and at least having a compressor disposed inside a cylinder of the fuel-injection pump wherein a pump plunger is slidably inserted, a high-pressure passage for guiding fuel in the compressor to a fuel injection nozzle, and a fuel-supplying passage for supplying fuel supplied from a fuel-intake to said compressor;
   a solenoid valve disposed in the fuel-supplying passage of said fuel-injection pump, and having a valve to adjust the communication conditions between the compressor side and the fuel-intake side of said fuel-supplying passage, and controlling the motion of the valve in response to control signals externally supplied to the solenoid;
   a driving pulse forming means for forming a driving pulse having a pulse segment with a large duty ratio during a forced time period and a pulse segment with a duty ratio smaller than that of said forced time period during a limited time period, within the solenoid valve's driving period, which is determined by computing the valve-closed time period required to obtain a desired fuel-injection level from an engine throttle position and an engine rotational speed, and by the sum of the time delay in the solenoid valve's closing required for said solenoid valve to shut off said fuel-supplying passage and said valve closed-time period;
   a solenoid valve driving means for driving said solenoid valve in response to the driving pulse formed by said driving pulse forming means.

2. A fuel-injection pump as recited in claim 1, wherein the time delay in the solenoid valve's closing required for said valve to shut off said fuel-supplying passage is determined by a means for detecting an inflection point of said current supplied to said solenoid that occurs at the time point when said valve seats no the valve seat, and by a means for counting the time period from the time point when the pulse to drive said solenoid valve is output by said solenoid valve driving means until the time point when said valve is seated.

3. A fuel-injection pump as recited in claim 1, further comprising a first generator for generating a pulse having a large duty ratio at specific time intervals, for a specific time period, and a second generator for generating a pulse having a duty ratio smaller than that of the pulse generated from said first generator, wherein the pulse output from said second generator during said solenoid valve's driving period and the pulse output from said first generator are input to an OR gate for forming a forced time period and a limited time period for said driving pulse.

4. A fuel-injection pump as recited in claim 1, wherein the driving pulse forming means includes means for ending the force time period of said driving pulse when the current applied to the solenoid exceeds a specific value.

5. A fuel-injection pump as recited in claim 1, wherein said valve-closed time period is determined by a means for computing a desired injection level based on said engine throttle position and engine rotational speed, by converting said computed desired injection level to a cam angle necessary to obtain the injection level, and subsequently, by computing the time necessary for the cam to rotate by the cam angle.

6. A fuel-injection device as recited in claim 1, wherein the solenoid valve extendedly installed on the side of the injection pump, and inserted by a slidable rod having said valve has a valve housing with a valve seat for said valve to be seated on, a header mounted on said valve housing to cover said valve and to create a space to accommodate said valve between itself and said valve housing, a solenoid facing an armature secured to said rod and positioned at the opposite side to said header of said valve housing, and a spring constantly pushing said valve away from said valve seat, and wherein said fuel supplying passage is reaching near said valve's accommodating space and said rod that connects to this accommodating space at the time of the valve's opening.

7. A fuel-injection device comprising:
a fuel-injection pump for an engine and at least having a compressor disposed inside a cylinder of the fuel-injection pump wherein a pump plunger is slidably inserted, a high-pressure passage for guiding fuel in the compressor to a fuel injection nozzle, and a fuel-supplying passage for supplying fuel supplied from fuel-intake to said compressor;
a solenoid valve disposed in the fuel-supplying passage of said fuel-injection pump, and having a valve to adjust the communication conditions between the compressor side and the fuel-intake side of said fuel-supplying passage, and controlling the motion of the valve in response to control signals externally supplied to the solenoid;
an electrical source voltage detecting means for detecting an electrical source voltage used to control said solenoid valve;
a driving pulse adjusting means for forming a driving pulse, which contains the pulse having a large duty ratio for a forced time period and a subsequent pulse having a duty ratio for a limited time period, within said solenoid valve's driving time period determined by the sum of the time delay in the solenoid valve's closing required for said solenoid valve to shut off said fuel-supplying passage and the valve-closed time period required to obtain a desired fuel-injection level, computed from an engine throttle position and engine rotational speed, and wherein the duty ratio of said forced time period and that of said limited time period are adjusted according to the electrical source voltage detected by said electrical source voltage detecting means.

8. A fuel-injection pump, as recited in claim 7, having a first generator for generating pulse having a large duty ratio at specific time intervals, for a specific time period, and a second generator for generating a pulse having a duty ratio smaller than that of the pulse generated from said first generator, wherein the pulse output from said second generator during said solenoid valve's driving period and the pulse output from said first generator are input to an OR gate for preliminarily forming a forced time period and a limited time period for said driving pulse, and the duty ratio of the driving pulse in said forced time period and that of said limited time period are adjusted by an adjusting means according to the electrical source voltage level detected by said electrical source voltage detecting means.

9. A fuel-injection device as recited in claim 7, wherein the duty ratio of the driving pulse of said forced time period and that of said limited time period are determined by a means using a preliminarily determined relationship, according to the electrical source voltage level detected by said electrical source voltage detecting means, and the driving pulse is formed by a means by directly using the forced time period and the duty ratio.

10. A fuel-injection device as recited in claim 7, wherein the forced time period of said driving pulse and the duty ratio of said limited time period increase according to the drop in electrical source voltage.

11. A fuel-injection pump as recited in claim 7, wherein said valve-closed time period is determined by a means for computing a desired injection level based on said engine throttle level and engine rotational speed, by converting said computed desired injection level to a cam angle necessary to obtain the injection level, and subsequently, by computing the time necessary for the cam to rotate by the cam angle.

12. A fuel-injection device as recited in claim 7, wherein the solenoid valve extendedly installed On the side of the injection pump, and inserted by a slidable rod having said valve has a valve housing with a valve seat for said valve to be seated on, a header mounted on said valve housing to cover said valve and to create a space to accommodate said valve between itself and said valve housing, a solenoid facing an armature secured to said rod and positioned at the opposite side to said header of said valve housing, and a spring constantly pushing said valve away from said valve seat, and wherein said fuel supplying passage is reaching near said valve's accommodating space and said rod that connects to this accommodating space at the time of the valve's opening.

13. A fuel-injection device comprising:
a fuel-injection pump for an engine and at least having a compressor disposed inside a cylinder of the fuel-injection pump wherein a pump plunger is slidably inserted, a high-pressure passage for guiding fuel in the compressor to a fuel-injection nozzle, and a fuel-supplying passage for supplying fuel supplied from a fuel-intake to said compressor;
a solenoid valve disposed in the fuel-supplying passage of said fuel-injection pump, and having a valve to adjust the communication conditions between the compressor side and the fuel-intake side of said fuel-supplying passage, and controlling the motion of the valve in response to control signals externally supplied to the solenoid;
a driving circuit for driving and controlling said solenoid valve;
a driving pulse forming means for forming a driving pulse that has a pulse width which is determined by the sum of the time delay in the solenoid valve's closing required for said solenoid valve to shut off said fuel-supplying passage and the valve-closed time length required for obtaining a desired fuel-injection level, computed from an engine throttle position and engine rotational speed, and is adjusted according to a voltage drop in a connection wire between the solenoid valve of the fuel-injection pump and the driving circuit for driving the solenoid valve;
a solenoid valve driving means for driving said solenoid valve in response to the driving pulse output from said driving pulse forming means.

14. A fuel-injection pump as recited in claim 13, wherein said driving pulse contains a forced time period, during which a segment of the driving pulse has a large duty ratio, and a subsequent limited time period, during which a segment of the driving pulse has a duty ratio smaller than that of said forced time period, and the duty ratio in said forced time period and that in said limited time period are corrected by a correcting means according to a voltage drop in the connection wire between the solenoid valve of the fuel-injection pump and the driving circuit driving said solenoid valve.

15. A fuel-injection pump as recited in claim 14, further comprising a first generator for generating a pulse having a large duty ratio at specific time intervals, for a specific time period, and a second generator for generating a pulse having a duty ratio smaller than that of the pulse generated from said first generator, wherein the pulse output from said second generator during said solenoid valve's driving period and the pulse output from said first generator are input to an OR gate for preliminarily forming a forced time period and a limited time period for said driving pulse, and the duty ratio of the driving pulse in said forced time period and that of said limited time a are corrected by a correcting means according to a voltage drop in the connecting wire between the solenoid valve and the driving circuit for driving the solenoid valve.

16. A fuel-injection pump as recited in claim 14, wherein the duty ratio of the driving pulse in said forced time period and that in said limited time period are determined by a means using a preliminarily determined relationship, according to a voltage drop in the connection wire between the solenoid valve of the fuel-injection pump and the driving circuit for driving the solenoid valve, and the driving pulse is formed by using this forced time period and the duty ratio.

17. A fuel-injection device as recited in claim 14, wherein the forced time period of said driving pulse and the duty ratio of said limited time length increase, as a voltage drop in the connection wire between the solenoid valve and the driving circuit to drive the solenoid valve increases.

18. A fuel-injection pump as recited in claim 13, wherein said driving pulse is a pulse of rectangular-shaped wave with a pulse width being determined by a means in accordance with the sum of the time delay in the solenoid valve's closing and the valve-closed time period, and its amplitude is corrected by a correcting means according to a voltage drop in the connection wire between the solenoid valve of the fuel-injection pump and the driving circuit for driving the solenoid valve.

19. A fuel-injection pump as recited in claim 13, wherein said driving pulse has a specific duty ratio and a pulse width determined by a means for computing the sum of the time delay in the solenoid valve's closing and of the valve-closed time period, and wherein said duty ratio is corrected by a correcting means according to a voltage drop in the connection wire between the solenoid valve of the fuel-injection pump and the driving circuit for driving the solenoid valve.

20. A fuel-injection pump as recited in claim 13, wherein said valve-closed time period is determined by a means for computing a desired injection level based on the engine throttle position and engine rotational speed, by converting said computed desired injection level to a cam angle necessary to obtain the injection level, and subsequently, by computing the time necessary for the cam to rotate by the cam angle.

21. A fuel-injection device as recited in claim 13, wherein the solenoid valve extendedly installed on the side of the injection pump, and inserted by a slidable rod having said valve has a valve housing with a valve seat for said valve to be seated on, a header mounted on said valve housing to cover said valve and to create a space to accommodate said valve between itself and said valve housing, a solenoid facing an armature secured to said rod and positioned at the opposite side to said header of said valve housing, and a spring constantly pushing said valve away from said valve seat, and wherein said fuel supplying passage is reaching near said valve's accommodating space and said rod that connects to this accommodating space at the time of the valve's opening.

22. A fuel-injection device comprising:
   a fuel-injection pump assigned to each cylinder of a multicylinder engine, and having a compressor disposed inside a cylinder of the fuel-injection pump wherein a pump plunger is slidably inserted, a high-pressure passage for guiding fuel in the compressor to a fuel injection nozzle, and a fuel-supplying passage for supplying fuel supplied from a fuel-intake to said compressor;
   a solenoid valve disposed in the fuel-supplying passage of said fuel-injection pump, having a valve to adjust the communication conditions between the compressor side and the fuel-intake side of said fuel-supplying passage, and controlling the motion of the valve in response to control signals externally supplied to the solenoid;
   a means for detecting a time delay in the solenoid valve's closing required for each solenoid valve of the fuel-injection pump to shut off the fuel-supplying passage of the corresponding fuel-injection pump;
   a driving pulse forming means for forming a pulse that has a pulse width which is determined by the sum of the time delay in the solenoid valve's closing detected by said means for detecting the time delay in the solenoid valve's closing and of the valve-closed time period required for obtaining a desired fuel-injection level and computed at least from an engine throttle position and engine rotational speed, and corrected so that the time delay in the solenoid valve's closing detected by said means for detecting the time delay in the solenoid valve's closing will be uniform for every solenoid valve;
   a solenoid valve driving means for driving said solenoid valve by the driving pulse output from said driving pulse forming means.

23. A fuel-injection device as recited in claim 22, wherein said driving pulse forming means reduces the driving voltage for the driving pulse in the cylinder of the engine having a shorter time delay in the solenoid valve's closing than the desired time delay in the solenoid valve's closing, and raises the driving voltage for the driving pulse in the cylinder of the engine having a longer time delay than the desired time delay in the solenoid valve's closing for correction.

24. A fuel-injection device as recited in claim 23, wherein said desired time delay is an average value of a specific value prescribed for every engine cylinder.

25. A fuel-injection device as recited in claim 23, said desired time delay in the solenoid valve's closing is an average value of the time delay in the solenoid valve's closing detected for every engine cylinder.

26. A fuel-injection pump as recited in claim 22, wherein said valve-closed time length is determined by a means for computing a desired injection level based on the engine throttle position and engine rotational speed, by converting said computed desired injection level to a cam angle necessary to obtain the injection level, and subsequently, by computing the time necessary for the cam to rotate by the cam angle.

27. A fuel-injection device as recited in claim 22, wherein the solenoid valve extendedly installed on the side of the injection pump, and inserted by a slidable rod having said valve has a valve housing with a valve seat for said valve to be seated on, a header mounted on said valve housing to cover said valve and to create a space to accommodate said valve between itself and said valve housing, a solenoid facing an armature secured to said rod and positioned at the opposite side to said header of said valve housing, and a spring constantly pushing said valve away from said valve seat, and wherein said fuel supplying passage is reaching near said valve's accommodating space and said rod that connects to this accommodating space at the time of the valve's opening.

* * * * *